US010044561B2

(12) United States Patent
Purusothaman et al.

(10) Patent No.: US 10,044,561 B2
(45) Date of Patent: Aug. 7, 2018

(54) APPLICATION PROVISIONING SYSTEM FOR REQUESTING CONFIGURATION UPDATES FOR APPLICATION OBJECTS ACROSS DATA CENTERS

(71) Applicant: Payoda Inc., Plano, TX (US)

(72) Inventors: Anand Purusothaman, Jersey, NJ (US); Murali Palanisamy, Jersey, NJ (US)

( * ) Notice: Subject to any disclaimer, the term of this patent is extended or adjusted under 35 U.S.C. 154(b) by 178 days.

(21) Appl. No.: 14/853,249

(22) Filed: Sep. 14, 2015

(65) Prior Publication Data

US 2017/0078144 A1 Mar. 16, 2017

(51) Int. Cl.
*G06F 15/177* (2006.01)
*H04L 12/24* (2006.01)
*H04L 29/08* (2006.01)
*G06F 8/65* (2018.01)
*G06F 9/445* (2018.01)

(52) U.S. Cl.
CPC ............ *H04L 41/0813* (2013.01); *G06F 8/65* (2013.01); *G06F 9/44505* (2013.01); *H04L 41/0843* (2013.01); *H04L 67/10* (2013.01)

(58) Field of Classification Search
CPC ..... H04L 41/0803; H04L 41/20; H04L 41/22; H04L 41/0813; H04L 41/0843; G06F 9/44505; G06F 17/243; G06F 8/60; G06F 8/65
See application file for complete search history.

(56) References Cited

U.S. PATENT DOCUMENTS

| | | | | |
|---|---|---|---|---|
| 6,978,301 B2* | 12/2005 | Tindal | ................. | H04L 41/0226 707/999.01 |
| 8,484,355 B1* | 7/2013 | Lochhead | ........... | H04L 41/0806 709/222 |
| 9,183,184 B2* | 11/2015 | Saiu | ...................... | G06F 17/211 |
| 9,235,649 B2* | 1/2016 | Teng | | |
| 2005/0232163 A1* | 10/2005 | Zabihi | ................... | H04L 41/082 370/254 |
| 2009/0094521 A1* | 4/2009 | Hung | ..................... | H04L 41/22 715/736 |
| 2010/0250907 A1* | 9/2010 | DeHaan | ..................... | G06F 8/60 713/1 |
| 2012/0154141 A1* | 6/2012 | Piccolo, III | ............ | G08B 25/14 340/539.11 |
| 2013/0080640 A1* | 3/2013 | Rai | .................... | G06Q 30/0224 709/226 |
| 2013/0254381 A1* | 9/2013 | Purusothaman | ...... | H04L 43/045 709/224 |

(Continued)

*Primary Examiner* — Shean Tokuta
(74) *Attorney, Agent, or Firm* — The Law Office of Austin Bonderer, PC; Austin Bonderer

(57) ABSTRACT

A computer implemented method for requesting configuration updates for one or more application objects using an application provisioning system is provided. The computer implemented method includes following steps: (i) creating an application provisioning template to receive one or more first inputs from a user for updating configuration of the one or more application objects; (ii) generating an application provisioning request for updating configuration of the one or more application objects based on the one or more first inputs; and (iii) generating a work order for the application provisioning request.

13 Claims, 20 Drawing Sheets

(56) References Cited

U.S. PATENT DOCUMENTS

| | | | | |
|---|---|---|---|---|
| 2014/0081685 A1* | 3/2014 | Thacker | ............... | G06Q 10/06 |
| | | | | 705/7.12 |
| 2015/0127792 A1* | 5/2015 | Messinger | .......... | H04L 41/0843 |
| | | | | 709/221 |
| 2015/0278219 A1* | 10/2015 | Phipps | ............... | G06Q 10/0637 |
| | | | | 707/711 |
| 2015/0373068 A1* | 12/2015 | Allen | ................. | H04L 65/4015 |
| | | | | 709/204 |
| 2016/0065672 A1* | 3/2016 | Savage | .............. | H04L 67/1095 |
| | | | | 709/219 |

* cited by examiner

| Template | Description | Associated Roles | Status |
|---|---|---|---|
| Create-LTM-vip | Template to create a new LTM virtual server, pool, monitor | admin, dev-team | Enabled |
| Modify-LTM-vip | Template to modify LTM virtual server, profiles, pool, mo... | admin, dev-team | Enabled |
| Delete-LTM-vip | Template to delete LTM virtual server, profiles, pool, mo... | admin, dev-team | Enabled |
| Modify-LTM-Pool | Template to modify LTM pool members | admin, dev-team, netw... | Enabled |
| Create-GTM-wip | Template to create GTM wide ip, pool, monitor, LTM virt... | admin, dev-team | Enabled |
| Modify-GTM-wip | Template to modify GTM wide ip, pool, monitor | admin, dev-team | Enabled |
| Create-LTM-vip | Template to create a new LTM virtual server, pool, monitor | admin, dev-team | Enabled |
| Modify-LTM-vip | Template to modify LTM virtual server, profiles, pool, mo... | admin, dev-team | Enabled |
| Delete-LTM-vip | Template to delete LTM virtual server, profiles, pool, mo... | admin, dev-team | Enabled |
| Modify-LTM-Pool | Template to modify LTM pool members | admin, dev-team, netw... | Enabled |
| Create-GTM-wip | Template to create GTM wide ip, pool, monitor, LTM virt... | admin, dev-team | Enabled |
| Modify-GTM-wip | Template to modify GTM wide ip, pool, monitor | admin, dev-team | Enabled |
| Create-GTM-wip | Template to create GTM wide ip, pool, monitor, LTM virt... | admin, dev-team | Enabled |
| Create-LTM-vip | Template to modify GTM wide ip, pool, monitor | admin, dev-team | Enabled |

| | | 310 | 312 | 314 | 316 | | | |
|---|---|---|---|---|---|---|---|---|
| | | | | | | | Admin | Logout |

App Provisioning System - Request

| Dashboard | | | | | |
|---|---|---|---|---|---|
| Ctrl Center | Form Builder | Config Block ADS | Config Block DNS | Add New Script | |
| Device | | | | | |
| APS | Template name: Create-LTM-vip | | Description | | |
| Config | | | | | |
| Account | | | | | |
| Report | | | | | |
| Alert | | | | | |
| Security | | | | | |

| Label name | Element type | Values | Field ID |
|---|---|---|---|
| AppView ID | Text box ▶ | | appviewid |
| Request Type | Radio button ▶ | Add, Modify | request_type |
| Environmental Info | Dropdown ▶ | DMZ Zone, Green Zone | env_info |
| Environmental Name | Dropdown ▶ | u: UAT,p:Production,d:Dev | env_name |
| Datacenters | Dropdown ▶ | Texas,California | datacenters |
| Application uses? | Radio button ▶ | http:HTTP, https:HTTPS | application_uses |
| HTTP or HTTPS Redirect.. | Radio button ▶ | Yes, No | http_redirect.. |
| Application FQDN | Text box ▶ | | application_fqdn |
| LB Method | Dropdown ▶ | round-robin,ratio,least-con | lb_method |

| | | |
|---|---|---|
| | | Admin Logout |

App Provisioning System - Template — 502

| St.No | Script Name | Count |
|---|---|---|
| | Search... | |
| 1 | getLTMVIPPoolConfig() | 3 |
| 2 | getLTMVIPList() | 2 |
| 3 | getLTMVIPConfig() | 1 |
| 4 | getLTMTrafficClassList() | 4 |
| 5 | getLTMTrafficClassConfig() | 5 |
| 6 | getLTMRuleList() | 3 |
| 7 | getLTMRuleConfig() | 2 |
| 8 | getLTMProfileList() | 5 |
| 9 | getLTMProfileConfig() | 7 |
| 10 | getLTMPoolList() | 2 |
| 11 | getLTMPoolConfig() | 5 |
| 12 | getLTMVIPList() | 1 |
| 13 | getLTMVIPConfig() | 4 |
| 14 | getLTMTrafficClassList() | 3 |
| 15 | getLTMTrafficClassConfig() | 7 |
| 16 | getLTMTrafficConfig() | 2 |

≪ 1 2 3 ≫

Dashboard
Ctrl Center
Device
APS
Config
Account
Report
Alert
Security getLTMVIPPoolConfig()

Name: getLTMVIPPoolConfig()
Type: SHELL ▼
Input:
Output:
Script:

[ Save ] [ Delete ] [ Cancel ]

| Dashboard | Provisioning > Request | | | | | |
|---|---|---|---|---|---|---|
| Ctrl Center | Search... | | | | | |
| Device | Request ID | Description | Created by | Created Date | Status | Activity Log |
| APS | R36 | Firewall Configuration | admin | 16/05/2015 19:26:13 | Open | View |
| Config | R35 | Load Balancer configurations | admin | 15/05/2015 19:26:13 | Open | View |
| Account | R34 | Firewall Configuration | admin | 15/05/2015 19:26:13 | Open | View |
| Report | R33 | Load Balancer configurations | admin | 15/05/2015 19:26:13 | Open | View |
| Alert | R32 | DNS Configuration | admin | 15/05/2015 19:26:13 | Open | View |
| Security | R31 | Load Balancer configurations | admin | 15/05/2015 19:26:13 | Open | View |
| | R30 | Load Balancer configurations | admin | 15/05/2015 19:26:13 | Open | View |
| | R29 | Firewall Configuration | admin | 15/05/2015 19:26:13 | Open | View |
| | R28 | Firewall Configuration | admin | 15/05/2015 19:26:13 | Open | View |
| | R27 | Cert Provisioning | admin | 15/05/2015 19:26:13 | Open | View |
| | R26 | Cert Provisioning | admin | 15/05/2015 19:26:13 | Open | View |
| | R25 | DNS Configuration | admin | 15/05/2015 19:26:13 | Open | View |
| | R24 | Firewall Configuration | admin | 15/05/2015 19:26:13 | Open | View |
| | R23 | DNS Configuration | admin | 15/05/2015 19:26:13 | Open | View |
| | R22 | Firewall Configuration | admin | 15/05/2015 19:26:13 | Open | View |

APPLICATION PROVISIONING SYSTEM FOR REQUESTING CONFIGURATION UPDATES FOR APPLICATION OBJECTS ACROSS DATA CENTERS

BACKGROUND

Technical Field

The embodiments herein generally relate to an application provisioning system, and more particularly, to a system and method of requesting configuration updates for one or more application objects, network devices configuration, and/or infrastructure components configuration on a consolidated platform across data centers.

Description of the Related Art

Application provisioning request management for application in networks are critical for application owners and network administrators. Existing legacy tools are not supported by development teams, as there are multiple different tools with each of them running on independent scripts. Collaboration among the tools is essential for the efficient functioning of a system. Existing applications are also independent of each another with access restricted to concerned independent teams. Thus, an unreasonable amount of time and resources are spent on writing scripts every time a team needs to monitor applications outside its scope of access. Also there is no single-view visibility of an application provisioning request across networking components running across multiple data centers.

Device/Object level operations on management tools makes routing traffic amongst data centers difficult and unnecessarily complex. This also amplifies the risk of errors and difficulties in setting up and altering rules to serve traffic. Monitoring applications, studying statistics, provisioning requests for application, and gauging the health of applications are highly complex in existing systems. An increased number of independent tools render migration/upgrading of network tools almost impossible. Also, fixing issues consumes time, which is very critical in industries like banking, healthcare, etc., where data management is critical.

The most common solutions for application provisioning request management for application are provided by device vendors themselves. However, these solutions request the devices and give a device-centric view of the network, which does not meet the requirements of application owners, network administrators, and CXOs to monitor network components.

Accordingly, there remains a need for an application provisioning system to request for configuration updates for one or more application objects, network devices configuration, and/or infrastructure components configuration based on a user request.

SUMMARY

In view of the foregoing, an embodiment herein provides an application provisioning system for requesting configuration updates for one or more application objects, network devices configuration, and/or infrastructure components configuration across data centers. The application provisioning system includes a memory unit, and a processor. The memory unit stores a database, and a set of modules. The processor executes the set of modules. The set of modules includes a template creation module, a request generation module, and a work order generation module. The template creation module, executed by the processor, is configured to create an application provisioning template to receive one or more first inputs from a user for updating configuration of the one or more application objects. The request generation module, executed by the processor, is configured to generate an application provisioning request for updating configuration of the one or more application objects based on the one or more first inputs. The work order generation module, executed by the processor, is configured to generate a work order for the application provisioning request.

In one embodiment, the one or more application objects includes at least one of (i) an object of an ADC device, (ii) a rule/policy of a firewall device, (iii) a certificate, (iv) a domain name system (DNS) record, and (v) a device that supports at least one of (a) an application program interface (API), and (b) a command line interface (CLI) mode of configuration. In another embodiment, the application provisioning system includes a template inventory module, a request inventory module, and a template modification module. The template inventory module, executed by the processor, is configured to provide one or more application provisioning templates that are stored in the database. The request inventory module, executed by the processor, is configured to provide one or more application provisioning requests that are stored in the database. The template modification module, executed by the processor, is configured to modify the one or more application provisioning templates. In yet another embodiment, the request inventory module includes a request search module, a sort module, and a refresh module. The request search module, executed by the processor, is configured to search at least one application provisioning requests from the one or more application provisioning requests based on a second input received from the user. The sort module, executed by the processor, is configured to sort the one or more application provisioning request based on column headers. The refresh module, executed by the processor, is configured to (a) check updates for the one or more application provisioning requests, and (b) check changes in status of the one or more application provisioning requests. In yet another embodiment, the request inventory module includes a request activity log module that is configured to provide (a) details of activities performed on the one or more application provisioning request, and (b) one or more work orders under the application provisioning request. In yet another embodiment, the template inventory module is configured to search at least one application provisioning template from the one or more application provisioning templates based on a third input received from the user. In yet another embodiment, the application provisioning system includes a form builder module. The form builder module, executed by the processor, is configured to provide one or more form fields in the application provisioning template to receive the one or more first inputs from the user for updating configuration of the one or more application objects. The form builder module is further is configured to provide scripts to generate configuration commands. In yet another embodiment, the application provisioning system includes a helper script module, a parser script module, and a configuration script module. The helper script module, executed by the processor, is configured to fetch details of the one or more application objects to generate configurations for the one or more application objects. The parser script module, executed by the processor, is configured to link the details fetched from the one or more application objects with the one or more form fields in the application provisioning template. The configuration script module, executed by the processor, is configured to (a) receive one or more inputs from a user, and (ii) compile logic to generate appropriate configuration commands. In yet another embodiment, the application provisioning system includes a request scenario module that is configured to create one or more application provisioning requests in a single work order using the application provisioning template. In yet another embodiment, the application provisioning system includes a work order repository module, and a work order review module. The work order repository module, executed by the processor, is configured to provide one or more work orders spawned for the application provisioning request. The work order review module, executed by the processor, is configured to (i) review the configurations of an application object, (ii) modify the configurations of the application object, (iii) submit the work order for approval, and (iv) implement the work order. In yet another embodiment, the work order repository module includes a work order search module, a clone work order module, and a rollback work order module. The work order search module, executed by the processor, is configured to search a work order from the one or more work orders using one or more keywords. The clone work order module, executed by the processor, is configured to clone a work order to obtain a cloned work order when the work order is rejected. The clone work order module is configured to (i) modify/update the cloned work order, and (ii) submit the updated cloned work order for approval. The rollback work order module, executed by the processor, is configured to rollback the implemented work order. The rollback work order module is configured to rollback a failed work orders.

In another aspect, a computer implemented method for requesting configuration updates for one or more application objects using an application provisioning system is provided. The computer implemented method includes following steps: (i) creating an application provisioning template to receive one or more first inputs from a user for updating configuration of the one or more application objects; (ii) generating an application provisioning request for updating configuration of the one or more application objects based on the one or more first inputs; and (iii) generating a work order for the application provisioning request.

In one embodiment, the computer implemented method further includes following steps: (i) providing one or more application provisioning templates that are stored in a database; (ii) providing one or more application provisioning requests that are stored in the database; and (iii) providing one or more work orders spawned for the application provisioning request. In another embodiment, the computer implemented method further includes following steps: (i) modifying at least one application provisioning template selected from the one or more application provisioning templates; and (ii) searching the work order from the one or more work orders using one or more keywords. In yet another embodiment, the computer implemented method further includes following steps: (i) cloning the work order to obtain a cloned work order when the work order is rejected; and (ii) rolling back the implemented work order.

In yet another aspect, a non-transitory program storage device readable by computer, and includes a program of instructions executable by the computer to perform a method requesting configuration updates for one or more application objects using an application provisioning system is provided. The method includes following steps: (i) creating an application provisioning template to receive one or more first inputs from a user for updating configuration of the one or more application objects; (ii) generating an application provisioning request for updating configuration of the one or more application objects based on the one or more first inputs; and (iii) generating a work order for the application provisioning request.

In one embodiment, the method further includes following steps: (i) providing one or more application provisioning templates that are stored in a database; (ii) providing one or more application provisioning requests that are stored in the database; and (iii) providing one or more work orders spawned for the application provisioning request. In another embodiment, the method further includes following steps: (i) modifying at least one application provisioning template selected from the one or more application provisioning templates; and (ii) searching the work order from the one or more work orders using one or more keywords. In yet another embodiment, the method further includes following steps: (i) cloning the work order to obtain a cloned work order when the work order is rejected; and (ii) rolling back the implemented work order.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A illustrates a user interface view of a template inventory module of FIG. 2 according to an embodiment herein;

FIG. 3B illustrates a user interface view of a template creation module of FIG. 2 according to an embodiment herein;

FIG. 3C illustrates a user interface view of a template modification module of FIG. 2 according to an embodiment herein;

FIG. 4 illustrates a user interface view for assigning a role to one or more users to access an application provisioning template according to an embodiment herein;

FIG. 5A illustrates a user interface view of a helper script module of FIG. 2 according to an embodiment herein;

FIG. 5B illustrates a user interface view of a parser script/associate script module according to an embodiment herein;

FIG. 5C illustrates a user interface view of a configuration script module according to an embodiment herein;

FIG. 6 illustrates a user interface view of a request inventory module of FIG. 2 according to an embodiment herein;

FIG. 7A illustrates a user interface view of a request generation module of FIG. 2 according to an embodiment herein;

FIG. 7B illustrates a user interface view of a request activity log module of the application provisioning system according to an embodiment herein;

FIG. 7C illustrates a user interface view of a request scenario module of FIG. 2 according to an embodiment herein;

FIGS. 8A and 8B illustrate user interface views of a work order generation module of FIG. 2 according to an embodiment herein;

FIG. 9 illustrates a user interface view of a work order review module according to an embodiment herein;

DETAILED DESCRIPTION OF PREFERRED EMBODIMENTS

Figure 1:
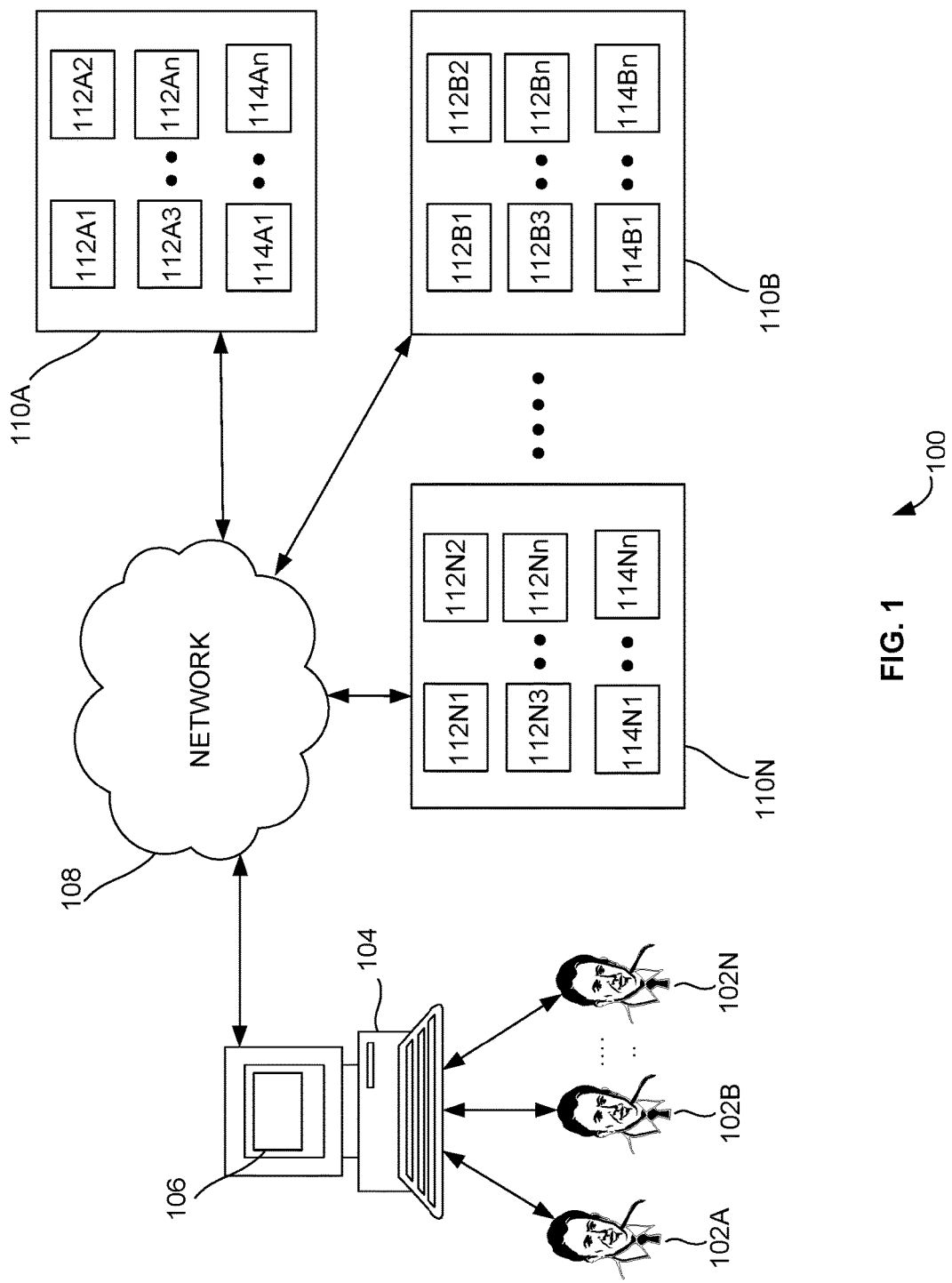
FIG. 1 illustrates a system view of one or more users communicating with a user system to request for configuration updates using an application provisioning system (APS) according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an application provisioning system which acts as a centralized system for (i) an administrator (e.g. a network administrator, server administrators, and an application administrator, etc.), (ii) a business users, and etc, for managing application provisioning requests of one or more application objects, network devices configuration, and infrastructure components configuration within the application. The embodiments herein achieve this by providing the application provisioning system that provides options to the one or more users to request for the required configuration updates of a device/object accessible to the one or more users via a vendor agnostic pre-defined and user defined template, based on business logic to enforce the configuration generation required to the provision of the application provisioning request. Referring now to the drawings, and more particularly to FIGS. 1 through 12, where similar reference characters denote corresponding features consistently throughout the figures, there are shown preferred embodiments.

FIG. 1 illustrates a system view 100 of one or more users 102A-N communicating with a user system 104 to request for configuration updates for one or more application objects 112A1-Nn of one or more network devices operating in one or more datacenters 110A-N on granular object level using an application provisioning system (APS) 106 according to an embodiment herein. The application provisioning system 106 provides the user interface to the one or more users 102A-N to request for the required configuration updates for the one or more application objects 112A1-Nn (e.g. an application delivery controller (ADC) device, objects of the ADC device, a rule/policy details of a firewall devices, a domain name system (DNS) record, and a certificate) in the user system 104. The required configuration updates are provided to the user system 104 from the one or more datacenters 110A-N on the granular object level using the application provisioning system 106 based on a request of the one or more users 102A-N. The system view 100 further includes a network 108. In one embodiment, the one or more application objects 112A1-Nn include a BIG IP device from F5 networks, ACE—Application Control Engine from Cisco, and NetScaler from Citrix etc. The one or more datacenters 110A-N includes one or more IP servers 114A1-Nn. In one embodiment, the one or more IP servers 114A1-Nn also called as domain server, or non-domain server. In another embodiment, the one or more datacenters 110A-N is vendor configuration devices. In yet another embodiment, the application provisioning system 106 may configured to request for configuration updates for network devices configuration, and infrastructure components configuration.

Figure 2:
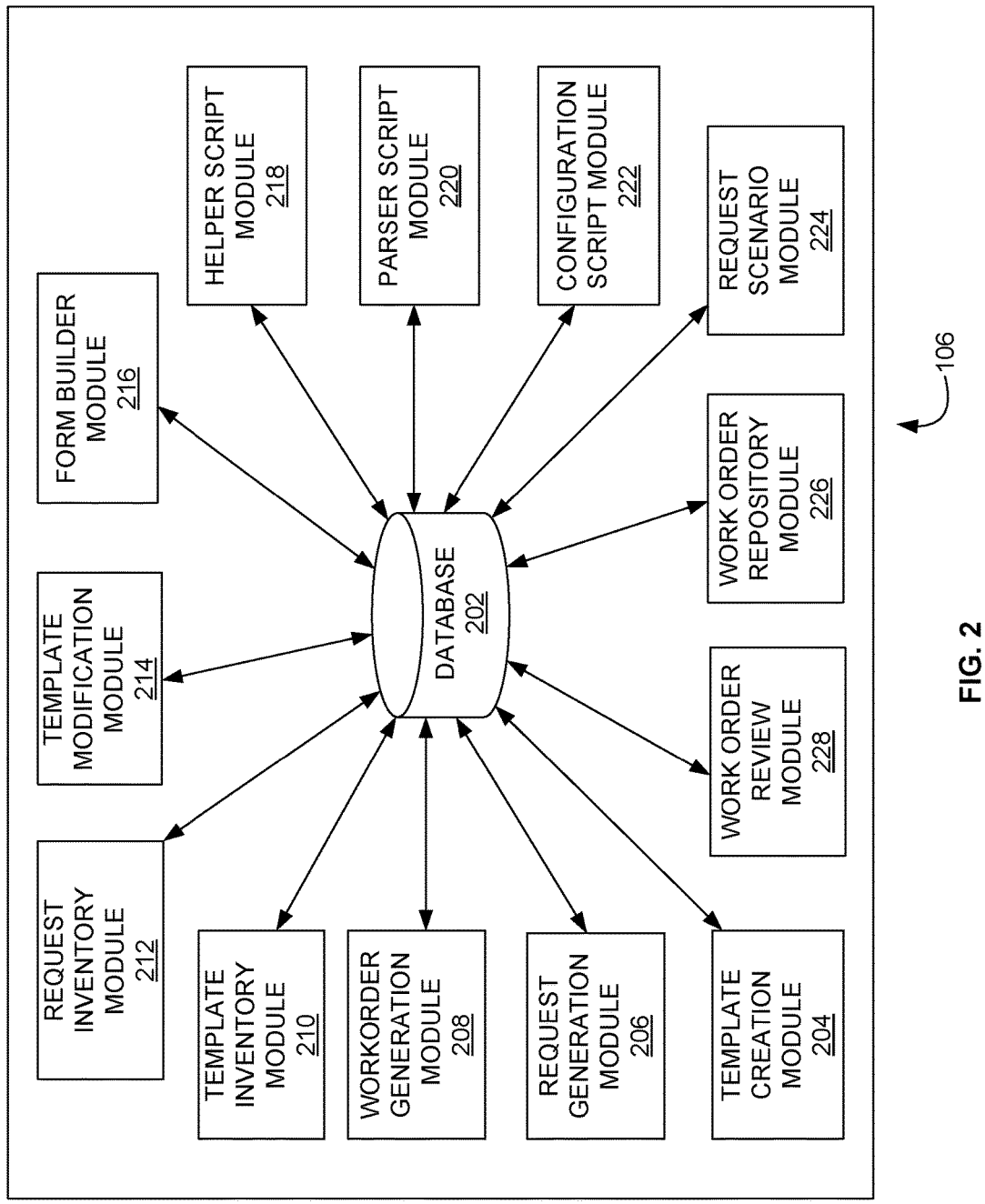
FIG. 2 illustrates an exploded view of the application provisioning system of FIG. 1 according to an embodiment herein.

FIG. 2 illustrates an exploded view of the application provisioning system 106 of FIG. 1 according to an embodiment herein. The application provisioning system 106 includes a database 202, a template creation module 204, a request generation module 206, and a work order generation module 208. The database 202 is capable of storing all data of the simulation, emulation and/or prototype data. The template creation module 204 is configured to create an application provisioning template to receive one or more first inputs from the one or more users 102A-N for updating configuration of the one or more application objects 112A1-Nn. In one embodiment, the template creation module 204 is configured to modify the existing application provisioning templates. In another embodiment, the application provisioning template is created by (i) an administrator (e.g. a network administrator, server administrators, and an application administrator, etc.), (ii) a business users, and etc. The request generation module 206 is configured to generate an application provisioning request for updating configuration of the one or more application objects 112A1-Nn based on the one or more first inputs. The work order generation module 208 is configured to generate a work order for the application provisioning request. In one embodiment, the work order generation module 208 generates the work order when the application provisioning request is received from the one or more user's 102A-N. In one embodiment, the work order is generated when the application provisioning request is submitted by the one or more user's 102A-N.

The application provisioning system 106 includes a template inventory module 210, a request inventory module 212, and a template modification module 214. The template inventory module 210 is configured to provide one or more application provisioning templates that are stored in the database 202. The template inventory module 210 is configured to search at least one application provisioning templates from the one or more application provisioning templates based on an input (i.e. keyword) received from the one or more user's 102A-N. The request inventory module 212 is configured to provide one or more application provisioning requests that are stored in the database 202. The template modification module 214 is configured to modify the one or more application provisioning templates.

The request inventory module 212 includes a request search module, a sort module, a refresh module, and a request activity log module. The request search module is configured to search at least one application provisioning request from the one or more application provisioning requests based on an input (i.e. keyword) received from the one or more users 102A-N. The sort module is configured to sort the one or more application provisioning request based on column headers (e.g., Request ID, Request Description, Details of the 'user' who submits the request, Date/time when the request was generated, Overall status of the request, and all activities performed on a request). The refresh module is configured to (a) check updates for the one or more application provisioning requests, and (b) check changes in status of the one or more application provisioning requests. The request activity log module is configured to provide details of activities performed on one or more application provisioning request.

The application provisioning system 106 further includes a form builder module 216, a helper script module 218, a parser script module 220, a configuration script module 222, a request scenario module 224, a work order repository module 226, and a work order review module 228. The form builder module 216 is configured to provide one or more form fields in the application provisioning template to receive the one or more first inputs from the one or more users 102A-N for updating configuration of the one or more application objects 112A1-Nn. The form builder module 216 is further configured to provide scripts to generate configuration commands. The helper script module 218 is configured to fetch details of the one or more application objects to generate configurations for the one or more application objects 112A1-Nn. The parser script module 220 is configured to link the details fetched from the one or more application objects 112A1-Nn with the one or more form fields in the application provisioning template. The configuration script module 222 is configured to (a) receive a plurality of inputs from a user, and (ii) compile logic to generate appropriate configuration commands. In one embodiment, the configuration script module 222 is configured to define configurations of the one or more application objects 112A1-Nn. The request scenario module 224 is configured to create the one or more application provisioning requests in a single work order using the application provisioning template. The work order repository module 226 is configured to provide one or more work orders spawned for the application provisioning request. The work order review module 228 is configured to (i) review configurations of an application object 112, (ii) modify the configurations of the application object 112, (iii) submit the work order for approval, and (iv) implement said work order.

The work order repository module 226 includes a work order search module, a clone work order module, and a rollback work order module. The work order search module is configured to search a work order from the one or more work orders using one or more keywords. The clone work order module is configured to clone a work order to obtain a cloned work order when the work order is rejected. The clone work order module configured to (i) modify/rectify the cloned work order, and (ii) submit the updated cloned work order for approval. The rollback work order module is configured to rollback the implemented work order. The rollback work order module is configured to rollback a failed work orders.

In one embodiment, the application provisioning system 106 provides a request snapshot module. The request snapshot module is configured to provide the details as follows: (i) new additions to the application provisioning request, (ii) modifications of the application provisioning request, (iii) deletions made as part of the application provisioning request (e.g. changes to pool members). In one embodiment, the changes/modifications in the application provisioning request are indicated through appropriate color codes.

FIG. 3A illustrates a user interface view 300A of the template inventory module 210 of FIG. 2 according to an embodiment herein. The user interface view 300A of the template inventory module 210 is configured to provide one or more application provisioning templates that are stored in the database 202. The user interface view 300A of the template inventory module 210 further includes (i) a template name field 302 that provides name of the application provisioning templates, (ii) a description field 304 that provides the user defined description for the application provisioning templates, (iii) associated roles field 306 that provides roles of the one or more users 102A-N who are able to access the application provisioning template, and (iv) a status field 308 provides a status of the application provisioning templates. In one embodiment, the associated roles field 306 provides an option to the one or more users 102A-N to (a) generate an application provisioning template to request configuration updates for an application object 112, or (b) modify the existing application provisioning templates to request configuration updates for an application object 112. The status field 308 provides a status of the application provisioning templates. In one embodiment, the application provisioning template is used to create an application provisioning request when the application provisioning template is enabled. The user interface view 300A of the template inventory module 210 provides an option to the one or more users 102A-N to search at least one application provisioning template from the one or more application provisioning templates based on an input received from the one or more users 102A-N.

FIG. 3B illustrates a user interface view 300B of the template creation module 204 of FIG. 2 according to an embodiment herein. The user interface view 300B of the template creation module 204 is configured to provide one or more options to the one or more users 102A-N to provide one or more first inputs to create an application provisioning template for updating configuration of the one or more application objects 112A1-Nn. The user interface view 300B of the template creation module 204 includes a form builder tab 310. The form builder tab 310 is configured to provide one or more form fields in the application provisioning template to receive the one or more first inputs from one or more users 102A-N for updating configuration of the one or more application objects 112A1-Nn. The form builder tab 310 is further configured to provide scripts to generate the configuration commands using (i) command line interface (CLI) (e.g., tmsh, ssh, and shell), and/or (ii) Application Program Interface (API) calls (e.g., Jason, XML, and REST). The steps to create the application provisioning template as follows: (a) defining the form fields with different element types, values and dependencies, (b) defining configuration blocks (i.e. script tabs) relevant to a device (i.e. an application delivery controller (ADC) device, a domain name system (DNS), and a firewall device), (c) defining configuration scripts (i.e. implementation, rollback, and post validation) under each configuration block, (d) associating appropriate workflow template for the implementation and the rollback configurations with pre-defined approval levels under the each configuration block, and (e) selecting save and/or save&enable the application provisioning template. The save&enable option that allows one or more users 102A-N to save and enable the application provisioning template. The application provisioning template is available for selection in the application provisioning request page when the application provisioning template is enabled. In one embodiment, the application provisioning template may be modified once the template is created.

The user interface view 300B of the template creation module 204 further includes a configuration block ADC tab 312, a configuration block DNS tab 314, and an add new script tab 316. The form builder tab 310 includes a template name field tab, a description field tab, a role association field tab, a label name field tab, an element type field tab, values field tab, a field ID tab, an associate scripts field tab, an ACL filter field tab, depends on field tab, a data validation field tab, a help field tab, and an order field tab, etc. The template name field tab provides a text area to enter a name of the application provisioning template. The description field tab provides a text area to enter the description for the application provisioning request. The role association field tab provides an option to select the roles as (i) an administrator (e.g. an administrator, a network administrator, server administrators, and application owner etc.), (ii) a business users, and etc, of the one or more users 102A-N who has access to (i) generate the application provisioning template to request the configuration updates, or (ii) modify the application provisioning template. The label name field tab provides a text area to enter the name of the label (i.e. an application, a request type, and environment info). The element type field tab provides an option to select the element type (e.g., text box, a radio button, drop down, and a tabular, etc.). The values field tab provides a text area to define appropriate values (e.g. the environment info such as UAT, DMZ, prod, and non-prod). In one embodiment, the values may delimited by comma. The field ID tab provides a text area to enter a field ID. The field ID tab is used to identify the form element in the backend script. The field ID tab supports "_","-", and alpha numeric characters. The character length of the field ID is minimum 1 (Min 1) and maximum 50 (Max 50). The associate scripts field tab provides a text area to enter the name of a parser script (i.e. associated with an embedded helper script). The depends on field tab provides a text area to create dependencies between multiple form fields using the field ID and values. In one embodiment, the depends on field tab may support "&", and "|". The character length of the depends on field tab is minimum 1 (Min 1) and maximum 64 (Max 64). The format of depends on field tab is "[Field Id1: value1 & Field Id2: value1]" and/or "[Field Id1: value1|Field Id2: value1]". The data validation field tab is entered to specify any mandatory validation to the field. The data validation field tab is configured to ensure the one or more users 102A-N capture right information while creating the application provisioning request. The data validation field tab supports JavaScript 'regex' validation (i.e. IP address validation). The character length of the data validation field is minimum 0 (Min 0) and maximum 120 (Max 120). The order field tab provides the order in which the form field is grouped. In one embodiment, the user interface view 300B provides an option to drag and drop the form fields to re-arrange the form fields. The help field tab allows the one or more users 102A-N to define field specific text shown in a request generation module 206. In one embodiment, the user interface view 300B of the template creation module 204 provides an option to configure any number of configuration blocks which are not predefined. The configuration block ADC tab 312 and the configuration block DNS tab 314 are defined depending on the one or more users 102A-N requirements. The user interface view 300B of the template creation module 204 provides an add option to the one or more users 102A-N to add additional form elements to the application provisioning template. The user interface view 300B of the template creation module 204 further provides a delete option to the one or more users 102A-N to delete the form elements. In one embodiment, the template role association field allows the administrator to assign a specific application provisioning template to one or more roles through the template creation module 204.

Figure 3C:
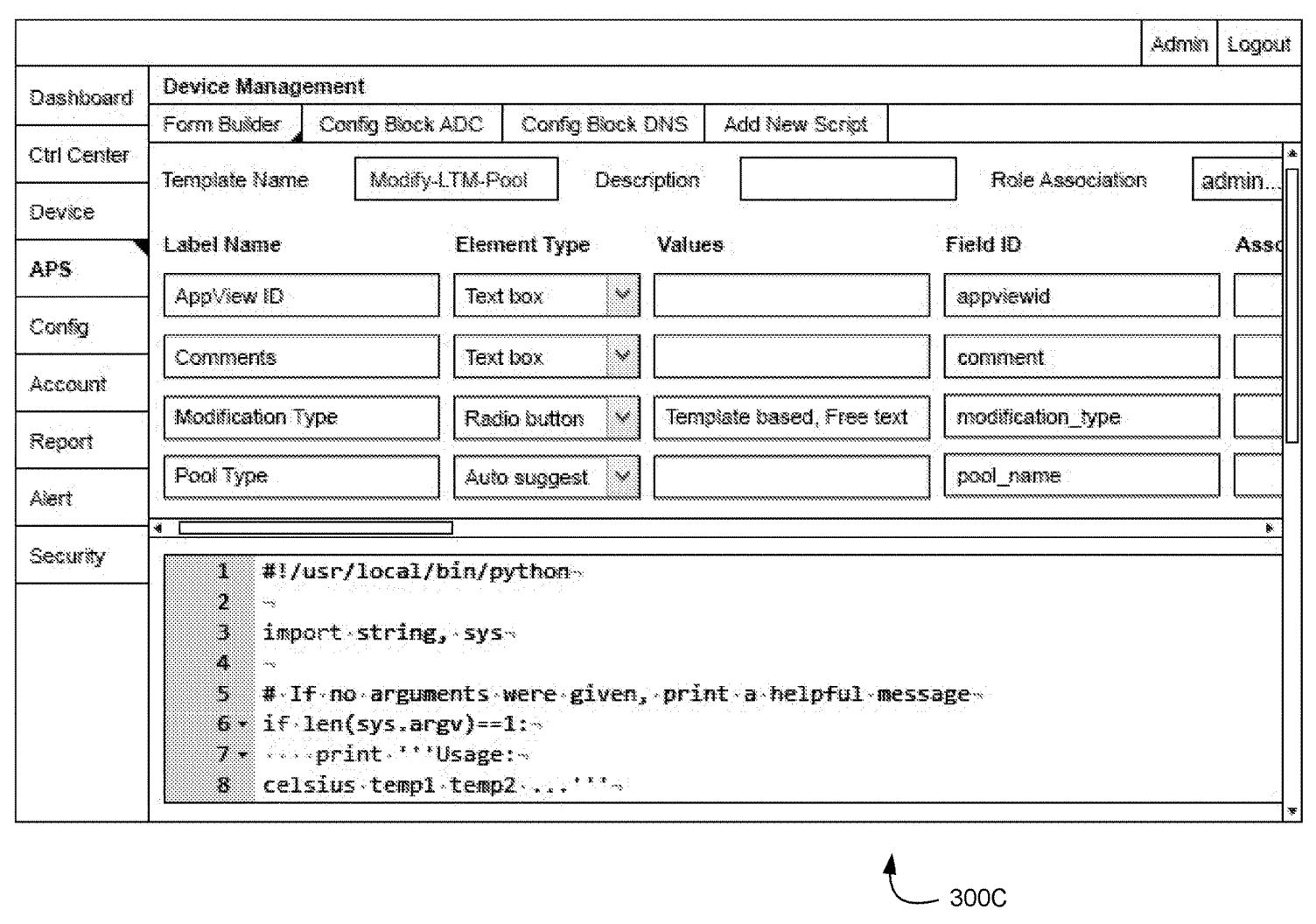

FIG. 3C illustrates a user interface view 300C of the template modification module 214 of FIG. 2 according to an embodiment herein. The user interface view 300C of the template modification module 214 provides an option to the one or more users 102A-N to modify the one or more application provisioning templates. In one embodiment, the application provisioning template is modified (i) at the time of creation of the application provisioning template, and (ii) when selecting the application provisioning template from the template inventory module 210. In another embodiment, the modification of the application provisioning template is similar to the creation of the application provisioning template. The application provisioning template is opened with the same format as creation of the template but the application provisioning template fields are filled based on the inputs that are given during creation of the application provisioning template. The user interface view 300C of the template modification module 214 provides an option to the one or more users 102A-N to (i) modify any of the fields of the application provisioning template, and (ii) save the changes/modifications with the application provisioning templates.

Figure 4:
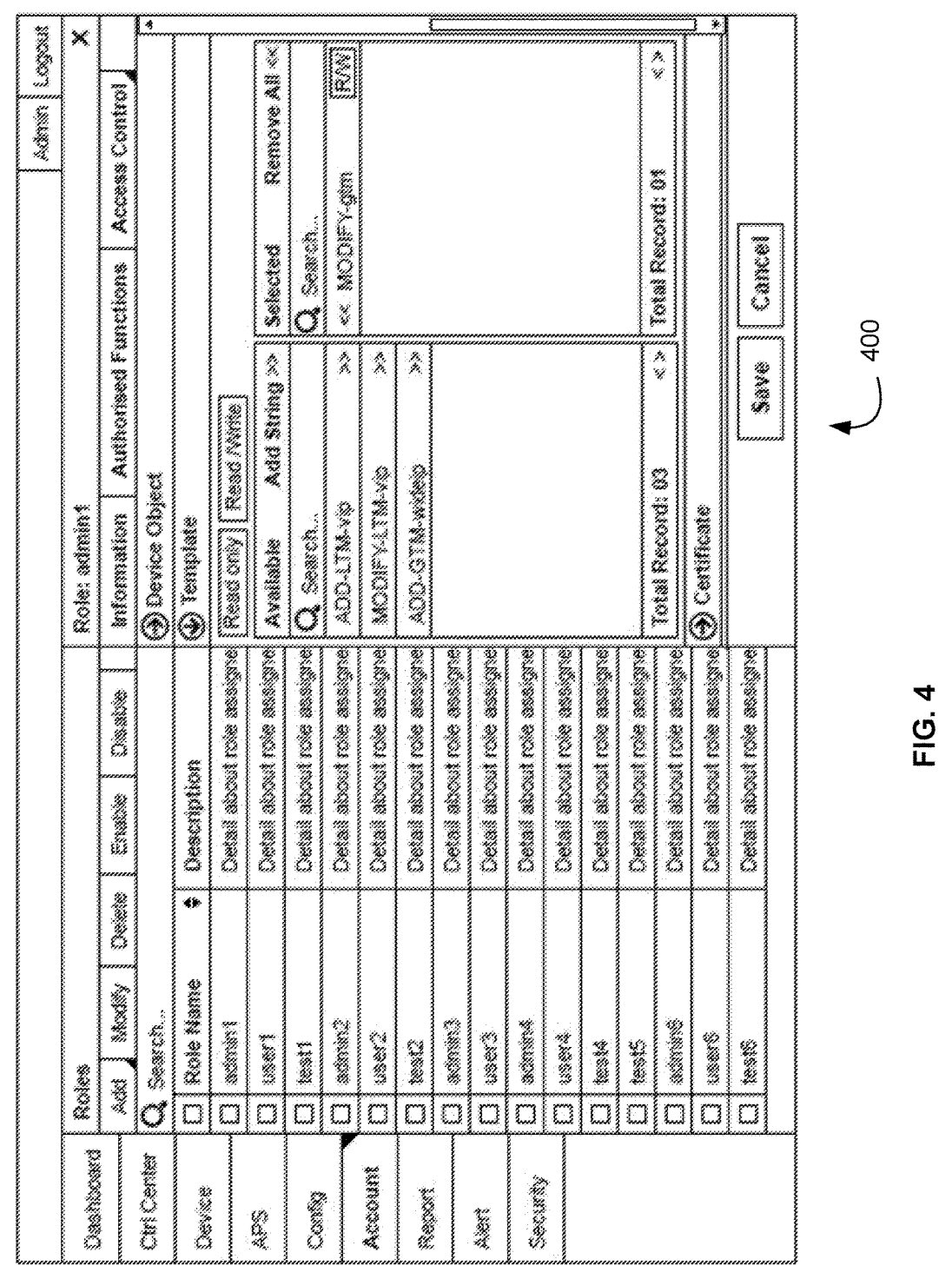

FIG. 4 illustrates a user interface view 400 for assigning a role to the one or more users 102A-N to access an application provisioning template according to an embodiment herein. The user interface view 400 provides an option the one or more users 102A-N (e.g., admin) to assign a role for other users to access the application provisioning template. In one embodiment, the user interface view 400 provides an option to administrators for assigning a role with read and/or write option for the one or more users 102A-N to access the application provisioning template. The user interface view 400 allows the administrators to perform the following steps for assigning a role to other users to access the application provisioning templates: (i) select a role to modify through account management, (ii) select a application provisioning template under the access control tab, (iii) select the appropriate access (e.g., read (R) or read/write (R/W)), and (iv) move the application provisioning template (s) to an assigned list from the available list and select save option to save changes. The user interface view 400 further includes a device field, a device object field, a certificate group field, and a templates field. The templates field includes the application provisioning templates that are created through the application provisioning system 106. In one embodiment, the administrator assigns the application provisioning templates specific to the roles of the one or more user 102A-N. The roles that are assigned through the application provisioning templates include read/write access by default. In one embodiment, the user interface view 400 allows the one or more users 102A-N to assign application provisioning template access to the one or more roles while creating or modifying the application provisioning template. The user interface view 100 allows the administrators to perform the following steps to assign an application provisioning template to a role: (i) create the new application provisioning template or modify the existing application provisioning template, (ii) view the list of one or more users 102A-N roles created in the application, (iii) select the one or more roles which needs to be given access under role association, and (iv) select save option to save changes.

FIG. 5A illustrates a user interface view 500A of the helper script module 218 of FIG. 2 according to an embodiment herein. The helper script module 218 is configured to fetch details of the one or more application objects 112A1-Nn to generate configurations for the one or more application objects 112A1-Nn (e.g., data center, device type, pool member information, etc.) based on which the configuration needs to be generated. In one embodiment, the helper script is defined based on devices type 'ltm' which need to be fetch from a specific datacenter 'APAC'. The user interface view 500A of the helper script module 218 provides an option to (i) the administrator (e.g. an administrator, a network administrator, server administrators, and application owner etc.), (ii) a business users, and etc, to perform the one or more actions. The one or more actions includes as follows: (i) define new scripts, (ii) search for an existing script, (iii) modifying the existing script. The user interface view 500A includes a script name field 502 that includes one or more script names. In one embodiment, the helper script module 218 fetch the one or more device pools for a device based on input parameters received from the one or more users 102A-N. In one embodiment, the helper script is defined by python language.

Figure 5B:
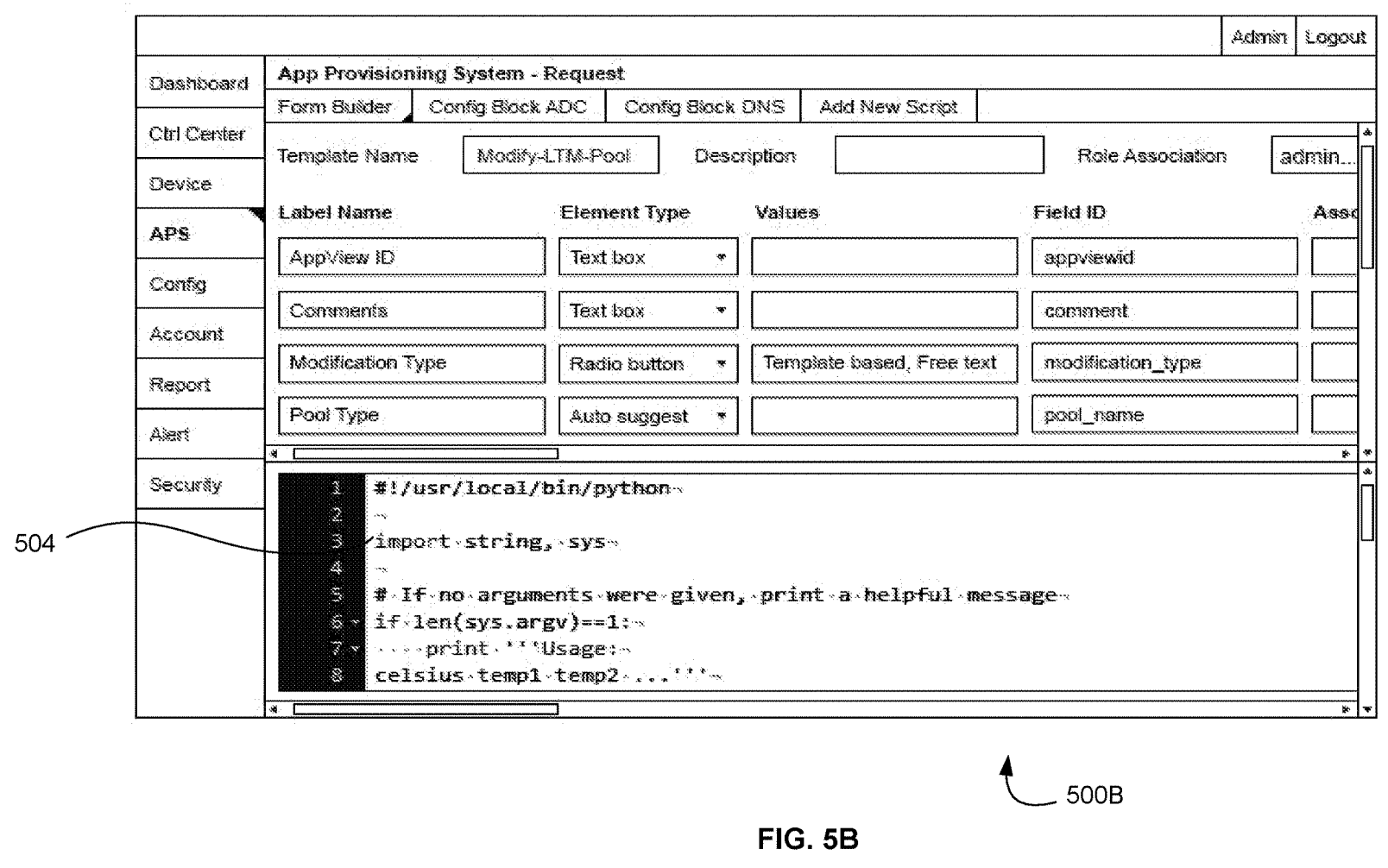

FIG. 5B illustrates a user interface view 500B of the parser script/associate script module 220 according to an embodiment herein. The user interface view 500B of the parser script module 220 is configured to link the details fetched from the one or more application objects 112A1-Nn with the one or more form fields in the application provisioning template. The user interface view 500B provides an option to (i) the administrator (e.g. an administrator, a network administrator, server administrators, and application owner etc.), (ii) a business users, and etc, to define the parser scripts/associate scripts and link the parser scripts/associate scripts to the relevant form field within the application provisioning template. In one embodiment, one or more associate scripts are defined in the template form builder. The user interface view 500B provides a parser script field 504 to define the parser scripts/associate scripts. The user interface view 500B provides an option to (i) the administrator (e.g. an administrator, a network administrator, server administrators, and application owner etc.), (ii) a business users, and etc, to associate the helper scripts with the parser script relevant to a particular form/field_id (e.g. Pool Name). In one embodiment, the parser script module 220 configured to create the application provisioning template with custom form fields, and field ID. The user interface view 500B allows the one or more users 102A-N to perform the following steps to define/link the associate script to a form field: (i) defining form fields with different element types, values, and dependencies through the template form builder, (ii) defining set of pre-defined 'helper scripts' to fetch the information from the database 202 (e.g., data center, device type, pool member information, etc), (iii) defining the script name, and embed the parser script with the helper script relevant to the configuration in the script editor section in the template form builder, and (iv) linking the defined script name with the relevant form field within the associate script column in the template section. In one embodiment, the associated script name is linked with the form field within the template form builder.

Figure 5C:
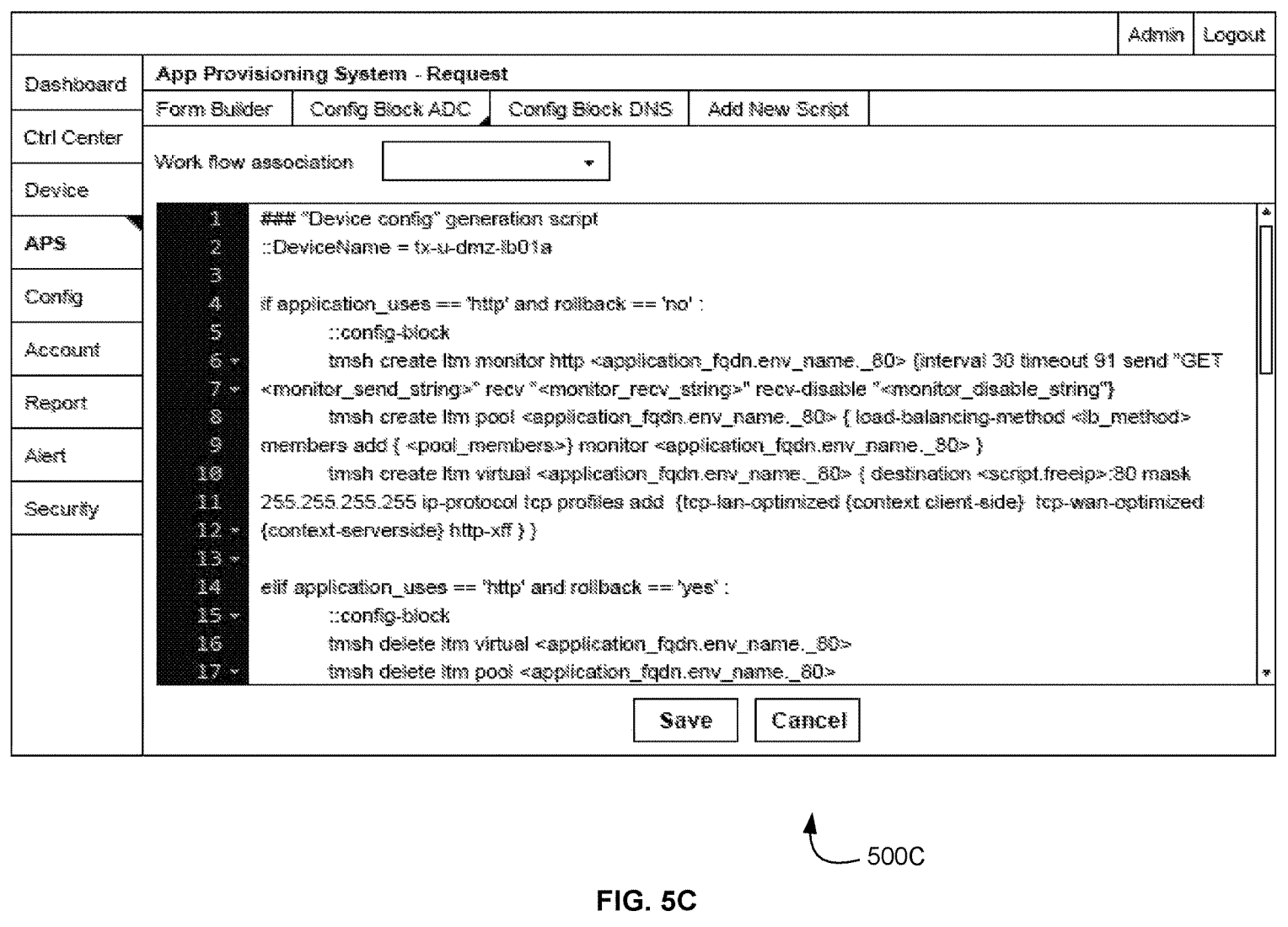

FIG. 5C illustrates a user interface view 500C of the configuration script module 222 according to an embodiment herein. The user interface view 500C of the configuration script module 222 is configured to (a) receive the input from the one or more users 102A-N through the application provisioning request, and (b) compile a logic to generate appropriate configuration commands using (i) command line interface (CLI) (e.g., tmsh, ssh, and shell), and/or (ii) Application Program Interface (API) calls (e.g., Jason, XML, and REST) that is pushed to the one or more application objects 112A1-Nn. The user interface view 500C provides an option to the administrator, and a business user to define configuration scripts for implementation, rollback, and post validation (within each configuration block), and link the work flow templates depending on the work order approval levels. In one embodiment, the configuration script is configured to define the configurations of the one or more application objects 112A1-Nn. In another embodiment, the configuration script is written in Python language. The configuration script includes commands which are executed on the devices. In one embodiment, the configuration command generates the commands (e.g. tmsh, ssh, shell, Jason, XML, and REST) to be executed on the on the devices. In one embodiment, the configuration script includes API's (Application Program Interface) to talk to devices and/or other systems. The user interface view 500C provides an option to the one or more user 102A-N to define custom workflow templates that define the number of approvals required for the change to be implemented.

Figure 6:
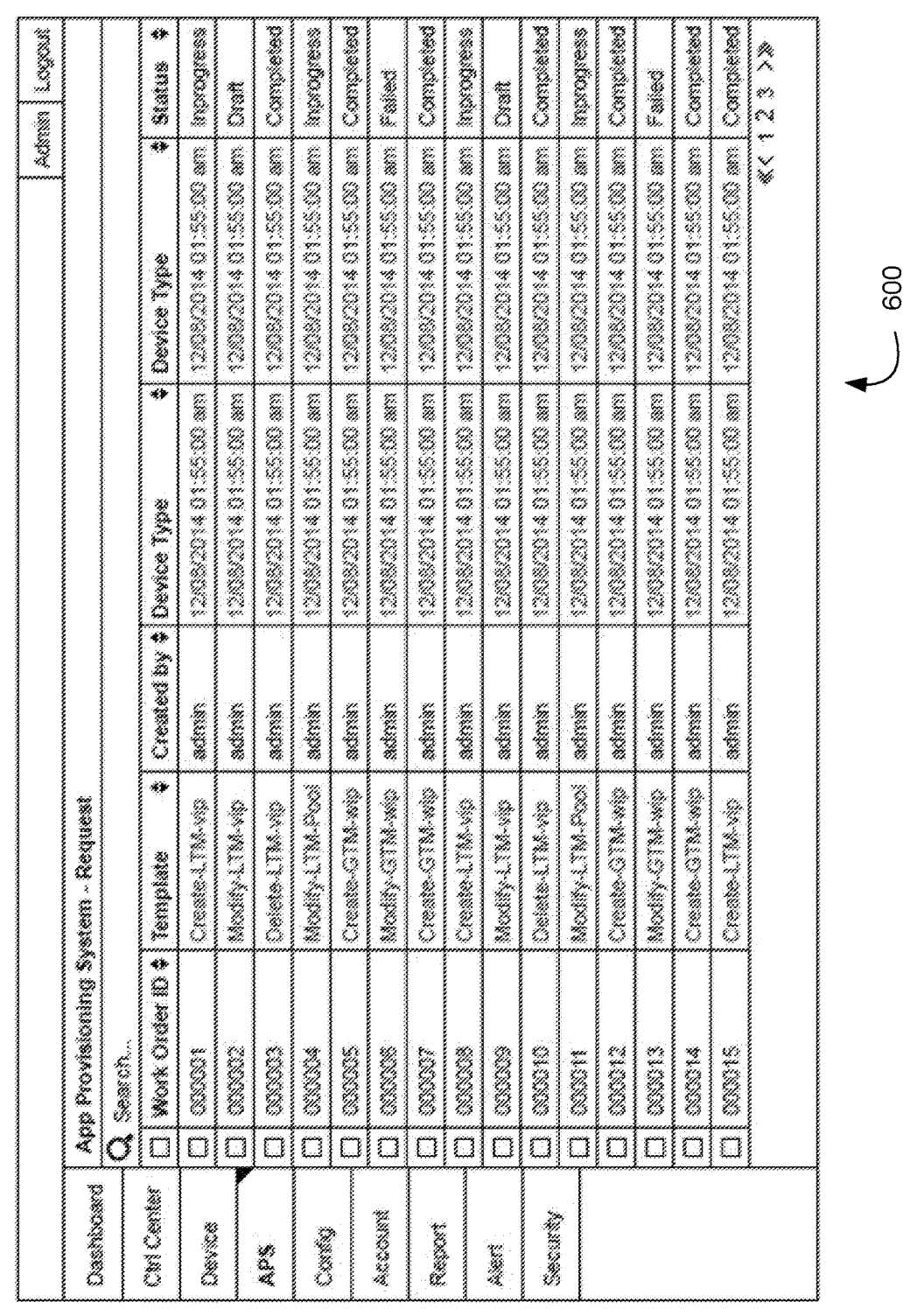

FIG. 6 illustrates a user interface view 600 of the request inventory module 212 of FIG. 2 according to an embodiment herein. The user interface view 600 of the request inventory module 212 is configured to provide one or more application provisioning requests that are stored in the database 202 with the details as follows: (i) a request ID for the application provisioning request, (ii) a description for the application provisioning request, (iii) the person who creates the application provisioning request (i.e. created by), (iv) a date and time of creation of the application provisioning request, (v) a status of the application provisioning request, and (vi) a request activity log to provide (a) details of activities performed on one or more the application provisioning request, and (b) one or more work orders under the application provisioning request. In one embodiment, the request ID is generated in a sequence order when the one or more application provisioning request is received from the one or more users 102A-N. In another embodiment, the status of the application provisioning request is indicated by a respective color code. The request activity log further provides the specific reasons for the work order failure (e.g., due to invalid scripts, and etc). The user interface view 600 of the request inventory module 212 provides one or more option to the one or more users 102A-N as follows: (i) a request search option to search at least one application provisioning request from the one or more application provisioning requests based on an input (i.e. keyword) received from the one or more users 102A-N, (ii) a create request option to create a new application provisioning request, (iii) a sort option to sort the one or more application provisioning request based on column headers, and (iv) a refresh option to (a) check updates for the one or more application provisioning requests, and (b) check changes in status of the one or more application provisioning requests. The user interface view 600 of the request inventory module 212 provides the status of the application provisioning request (i.e. dynamic changes of the application provisioning request) as follows: (i) open, and/or (ii) close. In one embodiment, the application provisioning request with at least one work order with status as 'In Progress' is marked as open. The application provisioning request with work orders with a combination of any of the following status: (i) rejected, (ii) discarded, and (iii) completed is marked as closed. In one embodiment, the keyword to search the application provisioning request is (a) request ID, (b) description, (c) user, (d) date/time, and (e) status. In another embodiment, the one or more application provisioning request is displayed in a order based on recently created request date.

Figure 7A:
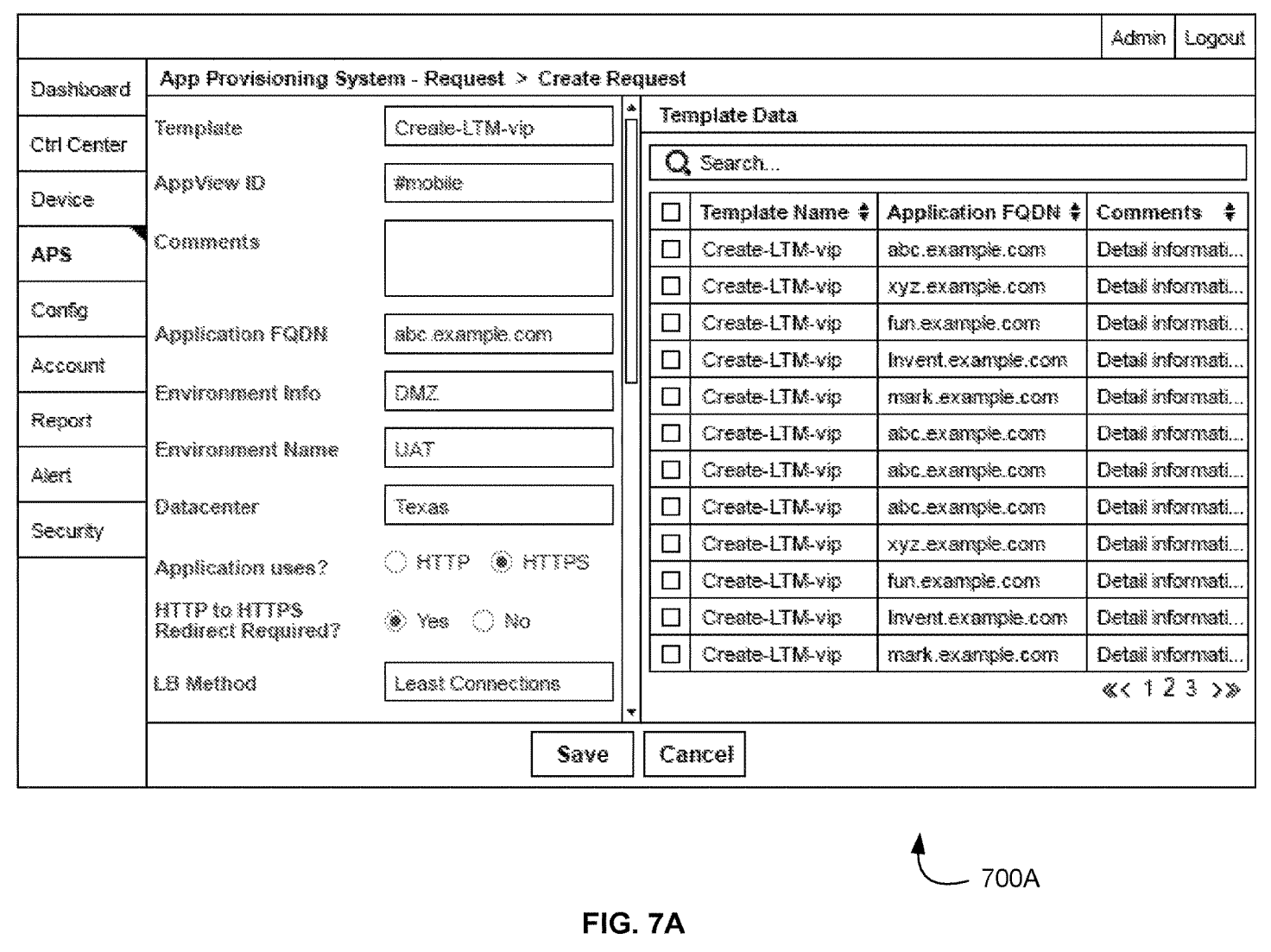

FIG. 7A illustrates a user interface view 700A of the request generation module 206 of FIG. 2 according to an embodiment herein. The user interface view 700A of the request generation module 206 is configured to generate an application provisioning request for updating configuration of the one or more application objects 112A1-Nn based on the one or more first inputs. In one embodiment, the application provisioning request is generated based on pre-defined application provisioning templates created by (i) an administrator (e.g. a network administrator, server administrators, an application administrator, or etc.), (ii) a business users, and etc. In another embodiment, the user interface view 700A of the request generation module 206 provides one or more options to the one or more user 102A-N to generate the application provisioning request (based on the application provisioning template defined in the template inventory module 210) with all necessary details to create/update/modify the one or more application objects 112A1-Nn (e.g. create a new pool, a pool member, and profiles). The user interface view 700A of the request generation module 206 provides a modify option to the one or more users 102A-N to modify the application provisioning request which is already submitted for the configuration updates. In one embodiment, the user interface view 700A of the request generation module 206 further configured to create/delete multiple request scenarios under the single application provisioning request. The user interface view 700A of the request generation module 206 includes (i) a template name field to provide the name of the application provisioning template, (ii) an application FQDN (fully qualified domain name) field, and (iii) a comments field to provide comments regarding the application provisioning request, or pre-defined application provisioning template.

FIG. 7B illustrates a user interface view 700B of a request activity log module of the application provisioning system 106 according to an embodiment herein. The user interface view 700B of a request activity log module is configured to provide details of activities performed on the application provisioning request such as (a) request generation errors, (b) individual work order stages, and (c) logs of work order. The user interface view 700B of the request activity log module is configured to provide (i) a search option to the one or more users 102A-N to search the application provisioning request, and (ii) a sort option to the one or more users 102A-N to sort the application provisioning request. In one embodiment, the application provisioning request is searched based on a keyword such as (i) a date, (ii) a work order stage, and (iii) a log message. The user interface view 700B of the request activity log module is configured to provide details of the application provisioning template as follows: (i) a request ID that provides request number spawned under the application provisioning request, (ii) a description about the application provisioning request, (iii) a person who creates the application provisioning request, (iv) the application provisioning request created date and time, (v) a status of the application provisioning request that provides different stages/status of the application provisioning request (i.e. in progress, approval, rejected, discarded, and rolled back), and (vi) an activity log of the application provisioning request that provides one or more reasons for failure of the application provisioning request to generate the work orders. In one embodiment, the one or more reasons are missing and/or valid script, and work order review comments.

Figure 7C:
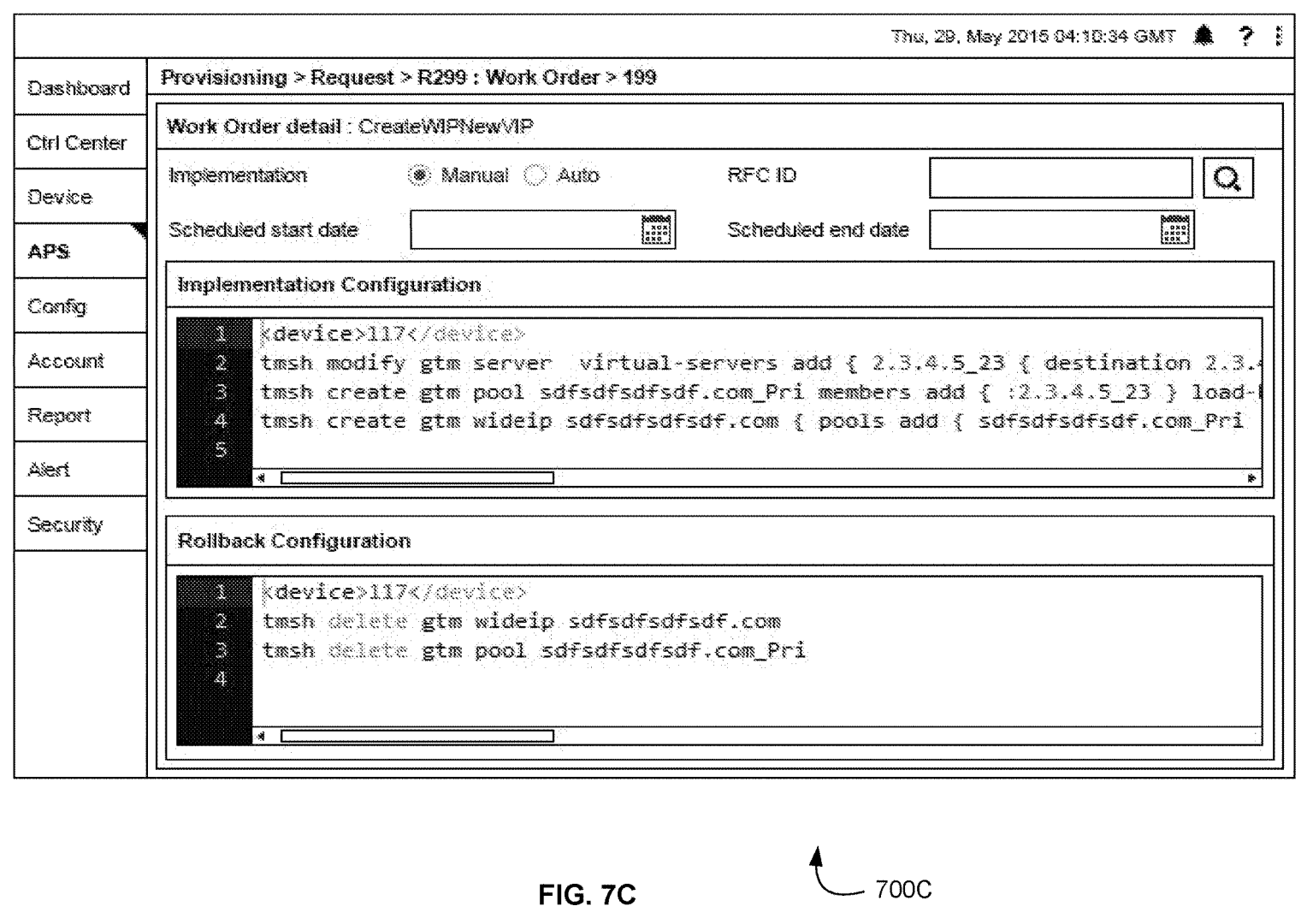

FIG. 7C illustrates a user interface view 700C of the request scenario module 224 of FIG. 2 according to an embodiment herein. The user interface view 700C of the request scenario module 224 is configured to create one or more application provisioning requests in a single work order using the application provisioning template. A single application provisioning request creates configurations to (i) one or more virtual internet protocols (VIP's), and (ii) one or more wide internet protocols (WIP's). The user interface view 700C of the request scenario module 224 provides a request scenario option to the one or more users 102A-N to generate the configurations on multiple environments (i.e. UAT, prod, pre-prod). In one embodiment, the user interface view 700C of the request scenario module 224 provides an option to modify/update the inputs in the application provisioning request before submitting the application provisioning request.

Figure 8A:
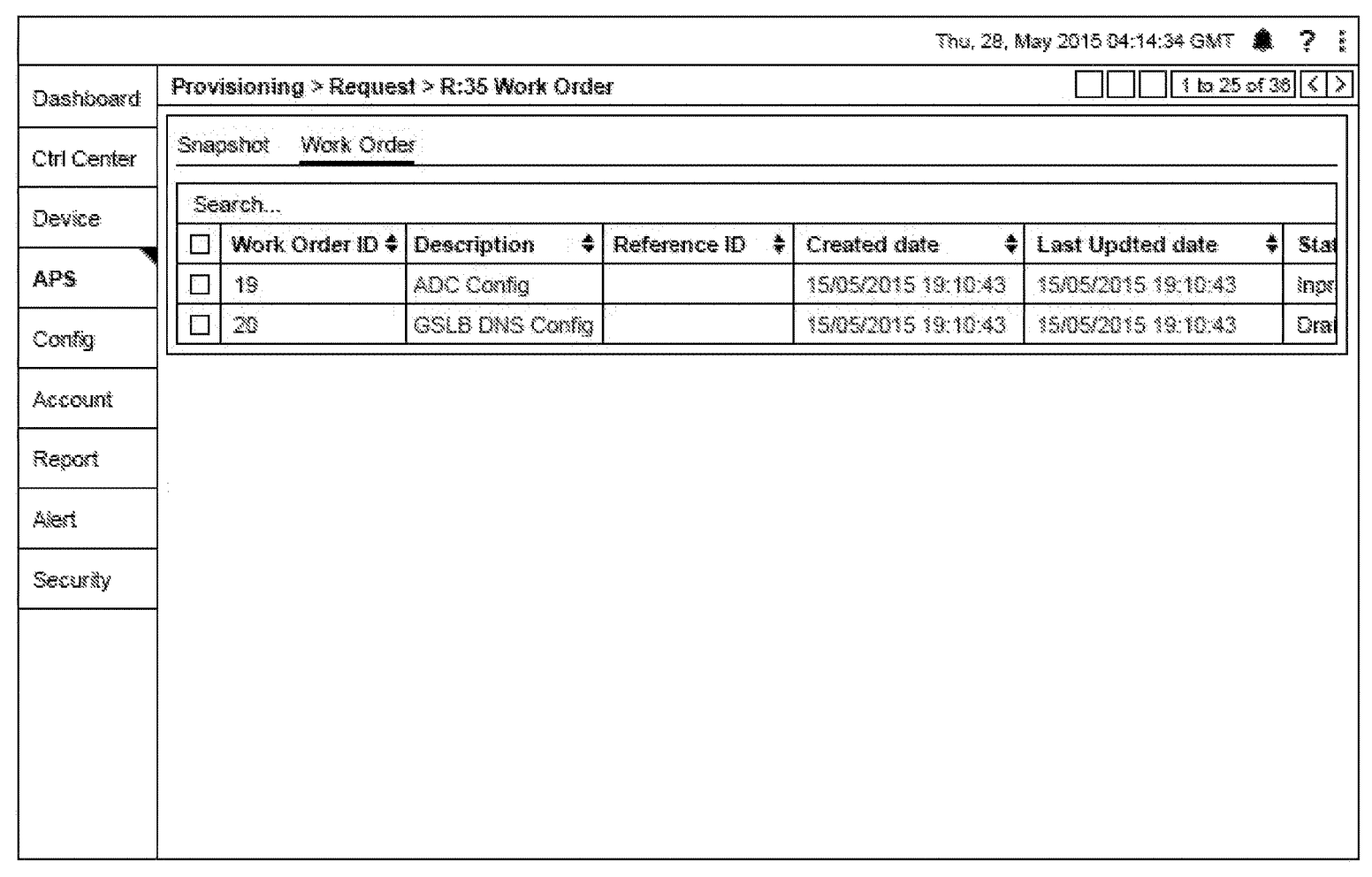
Figure 8B:

FIGS. 8A and 8B illustrate user interface views of the work order generation module 208 of FIG. 2 according to an embodiment herein. The user interface views of the work order generation module 208 is configured to generate a work order for the application provisioning request. The user interface views of the work order generation module 208 includes a work order repository that is configured to provide one or more work orders spawned for the application provisioning request. The one or more work orders are created by the application provisioning system 106 when the application provisioning request is submitted by the one or more users 102A-N. In one embodiment, the user interface views allow the administrator to view/perform an action on the one or more work orders. In one embodiment, the action includes approving the application provisioning request submitted by the one or more users 102A-N. The one or more work orders is generated when the application provisioning request is submitted successfully. The user interface views of the work order repository module 208 is configured to provide (i) a work order ID for a application provisioning request, (ii) a work order description for the application provisioning request, (iii) a reference ID for the work order, (iv) a work order created date and time, (v) a status of the work order, and (vi) a work order activity log. The work order ID is generated sequentially when the work order is spawned under the application provisioning request. The reference ID (parent work order ID) is generated when a new work order is created. The reference ID is applicable when the work order is cloned and rolled back. The work order description is captured by the one or more users 102A-N while defining the application provisioning template. The date and time of the work order is created when the work order gets spawned. The last updated date provides the date and time of the work order when one or more actions are performed on the work order. In one embodiment, the one or more actions includes (i) approving the application provisioning request, (ii) rejecting the application provisioning request, or (iii) discarding the application provisioning request. The status field provides the status of the work order (i.e. in progress, discarded, rejected, completed, and failed). The work order activity log provides details of the activities performed on the work order. The work order activity log includes comments that are logged for the work order review. The user interface views of the work order generation module 208 provides a work order search option to the one or more users 102A-N to search a work order from the one or more work orders using one or more keywords. In one embodiment, the one or more keywords includes (i) a work order ID, (ii) a description of the work order, (iii) a reference ID of the work order, (iv) created and last updated date of the work order, and (v) a status of the work order. The user interface views of the work order generation module 208 is configured to provide a clone work order option to the one or more users 102A-N to clone a work order to obtain a cloned work order when the work order is rejected. In one embodiment, the clone work order option allows the one or more users 102A-N to (i) modify/update the cloned work order, and (ii) submit the updated cloned work order for approval. The user interface views of the work order generation module 208 is further configured to provide a rollback option to the one or more users 102A-N to rollback the implemented work order (i.e. all the configurations). In one embodiment, the user interface views allow the one or more users 102A-N to rollback the failed work orders. The work order is created by the application provisioning system 106 when the application provisioning request is submitted by the one or more users 102A-N. In one embodiment, the user interface views of the work order generation module 208 allow the administrator to view/perform the actions on the one or more work orders, and tasks created under the administrator. In one embodiment, the action includes approving the application provisioning request. In another embodiment, the work order includes the one or more application provisioning request.

Figure 9:
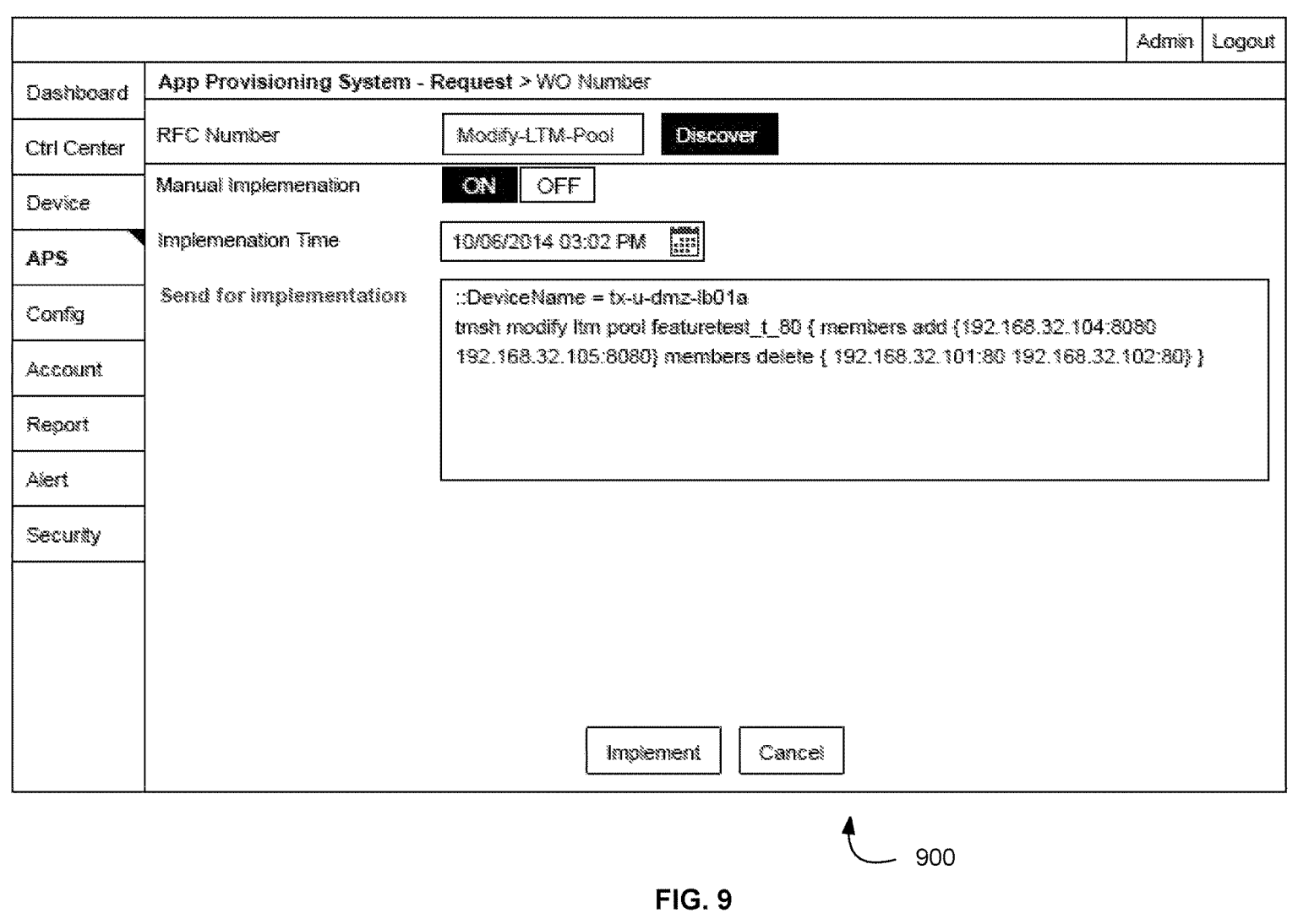

FIG. 9 illustrates a user interface view 900 of the work order review module 228 according to an embodiment herein. The user interface view 900 of the work order review module 228 is configured to (i) review the configurations of an application object 112 (i.e. implementation, rollback and post validation) generated as the request log, (ii) modify the configurations of the application object 112, (iii) submit the work order for approval, and (iv) implement the work order. The user interface view 900 of the work order review module 228 provides an option to one or more users 102A-N to implement the work order is implemented manually, and/or scheduled for an auto implementation. The user interface view 900 of the work order review module 228 is configured to provide a time of the work order implementation, and information (i.e. configurations of a device) send for work order implementation.

In one embodiment, the application provisioning system 106 provides options to the one or more users 102A-N to view the application provisioning requests. The application provisioning system 106 is further configured to provide the work orders that are spawned under each of the application provisioning request. In one embodiment, the application provisioning system 106 is configured to provide options to the one or more users 102A-N to create a new application provisioning request.

Figure 10A:
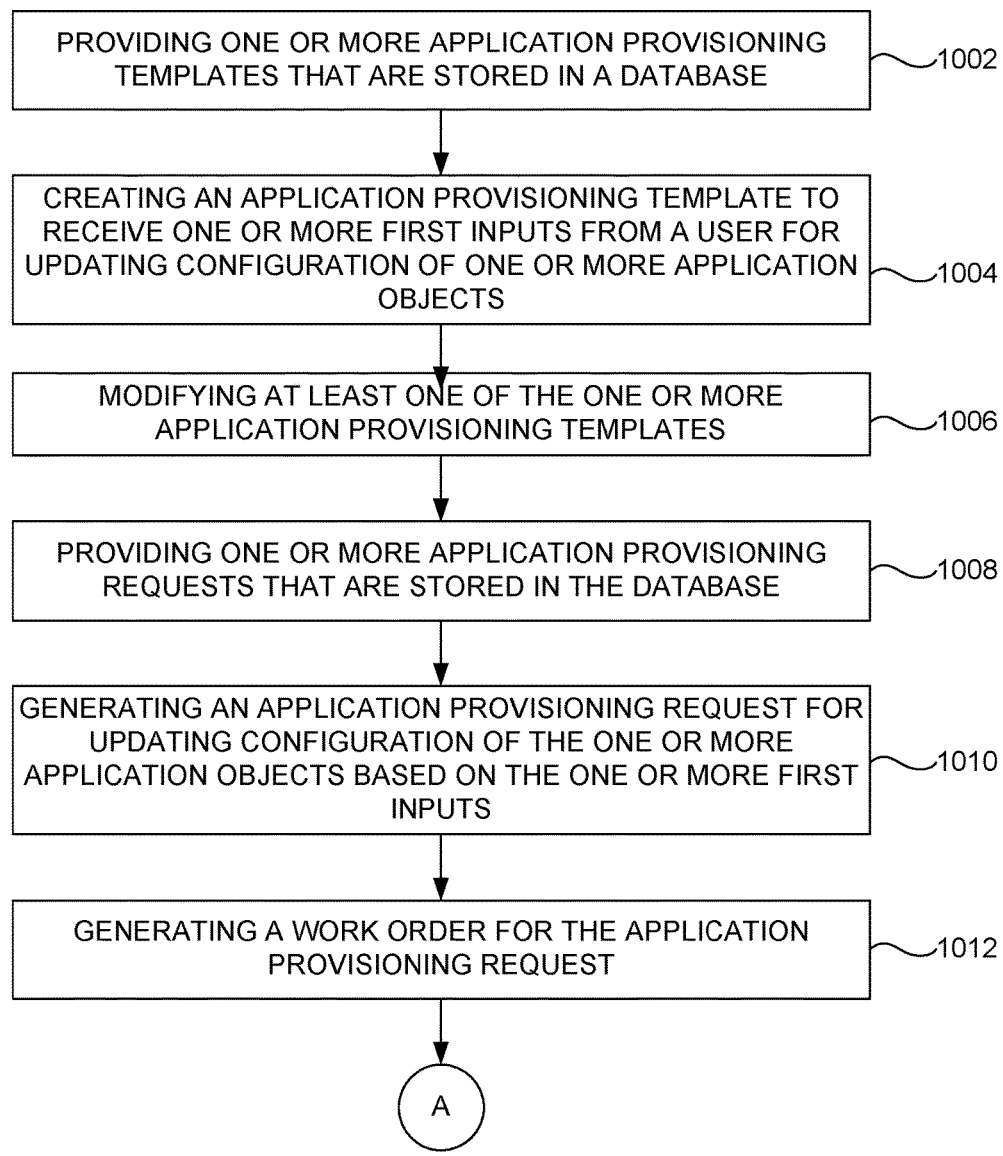
FIGS. 10A and 10B are flow diagrams illustrating a computer implemented method for requesting configuration updates for one or more application objects using the application provisioning system of FIG. 1 according to an embodiment herein.
Figure 10B:
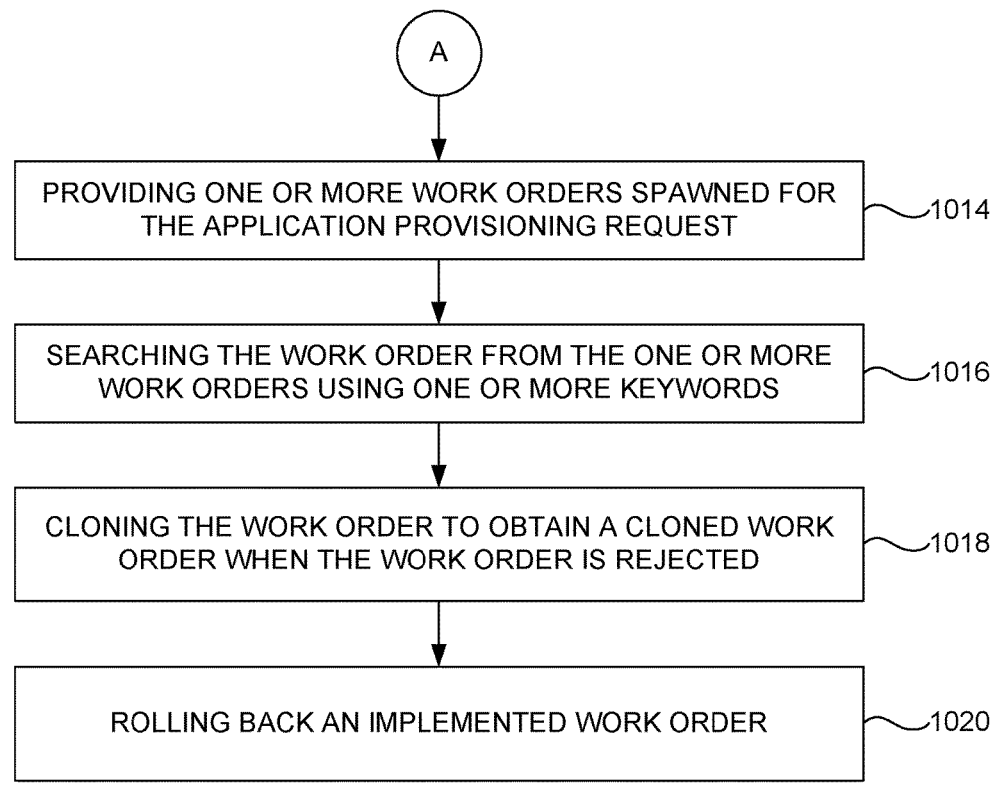

FIGS. 10A and 10B are flow diagrams illustrating a computer implemented method for requesting configuration updates for one or more application objects 112A1-Nn using an application provisioning system 106 of FIG. 1 according to an embodiment herein. In step 1002, the template inventory module 210 is configured to provide one or more application provisioning templates that are stored in the database 202. The template inventory module 210 provides an option to the one or more users 102A-N to search the one or more application provisioning templates. In one embodiment, the application provisioning template name is used as a keyword. In step 1004, the template creation module 204 is configured to create a new application provisioning template to capture the configuration inputs from the one or more users 102A-N for updating configuration of one or more application objects 112A1-Nn. The template creation module 204 includes a form builder. The form builder is configured to provide form fields to the application provisioning templates to capture the configuration inputs from the one or more users 102A-N. In step 1006, the template modification module 214 modifies one or more application provisioning templates. In step 1008, the request inventory module 212 is configured to provide one or more application provisioning requests based on an input (i.e. keyword) received from the one or more user's 102A-N. The request inventory module 212 provides the one or more option to the one or more users 102A-N such as: (i) a request search option to search an application provisioning request from one or more application provisioning requests using keywords as an input, (ii) a create request option to create an application provisioning request, (iii) a sort option to sort the one or more application provisioning requests based on column headers, and (iv) a refresh option to (a) check updates for the one or more application provisioning requests, and (b) check changes in the status of the one or more application provisioning requests. In step 1010, the request generation module 206 is configured to generate an application provisioning request for updating configuration of the one or more application objects 112A1-Nn. In one embodiment, the application provisioning request is generated based on pre-defined application provisioning templates that are created by the one or more users 102A-N. In step 1012, the work order generation module 208 is configured to generate a work order when the application provisioning request is received from the one or more user's 102A-N. In one embodiment, the work order is generated when the application provisioning request is submitted by the one or more user's 102A-N. In step 1014, the work order repository module 226 is configured to provide one or more work orders spawned for an application provisioning request. In step 1016, the work order generation module 208 provides a work order search option to the one or more users 102A-N to search one or more work orders by one or more keywords. In step 1018, the work order generation module 208 provides a clone work order option to the one or more users 102A-N to copy the work orders from the one or more work orders when the work order is rejected. In one embodiment, the clone work order option allows the one or more users 102A-N to (i) update the cloned work order, and (ii) submit the updated cloned work order to the work order approval. In step 1020, the work order generation module 208 further provides a rollback option to the one or more users 102A-N to rollback an implemented work order (i.e. all the configurations). In one embodiment, the user interface views allow the one or more users 102A-N to rollback failed work orders.

Figure 11:
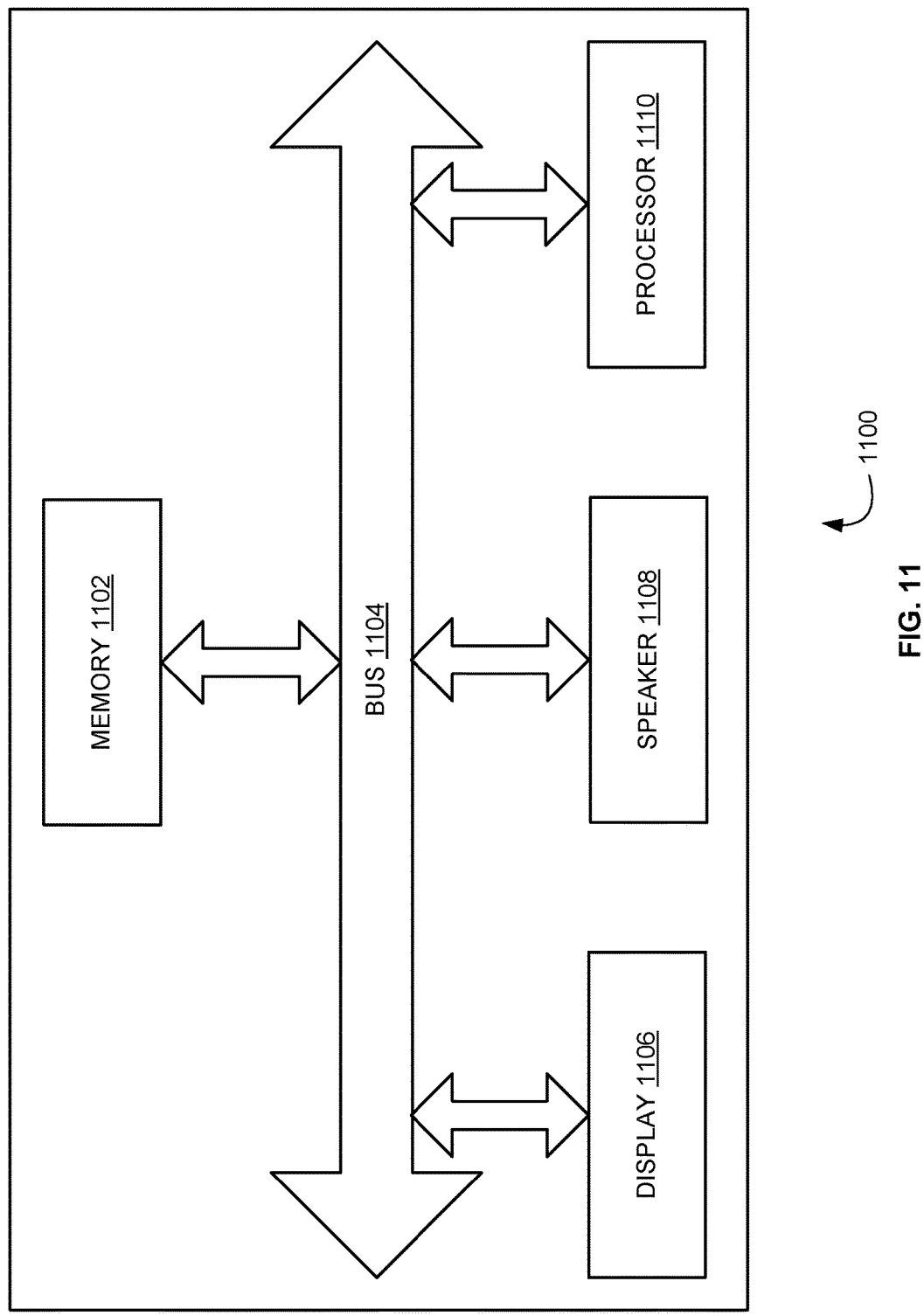
FIG. 11 illustrates an exploded view of a receiver of FIG. 1 according to an embodiment herein.

FIG. 11 illustrates an exploded view of a receiver 1100 of FIG. 1 having a memory 1102 having a set of instructions, a bus 1104, a display 1106, a speaker 1108, and a processor 1110 capable of processing the set of instructions to perform any one or more of the methodologies herein, according to an embodiment herein. The processor 1110 may also enable digital content to be consumed in the form of video for output via one or more displays 1106 or audio for output via speaker and/or earphones 1108. The processor 1110 may also carry out the methods described herein and in accordance with the embodiments herein.

Digital content may also be stored in the memory 1102 for future processing or consumption. The memory 1102 may also store program specific information and/or service information (PSI/SI), including information about digital content (e.g., the detected information bits) available in the future or stored from the past. A user of the receiver 1100 may view this stored information on display 1106 and select an item of for viewing, listening, or other uses via input, which may take the form of keypad, scroll, or other input device(s) or combinations thereof. When digital content is selected, the processor 1110 may pass information. The content and PSI/SI may be passed among functions within the receiver using the bus 1104.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 12:
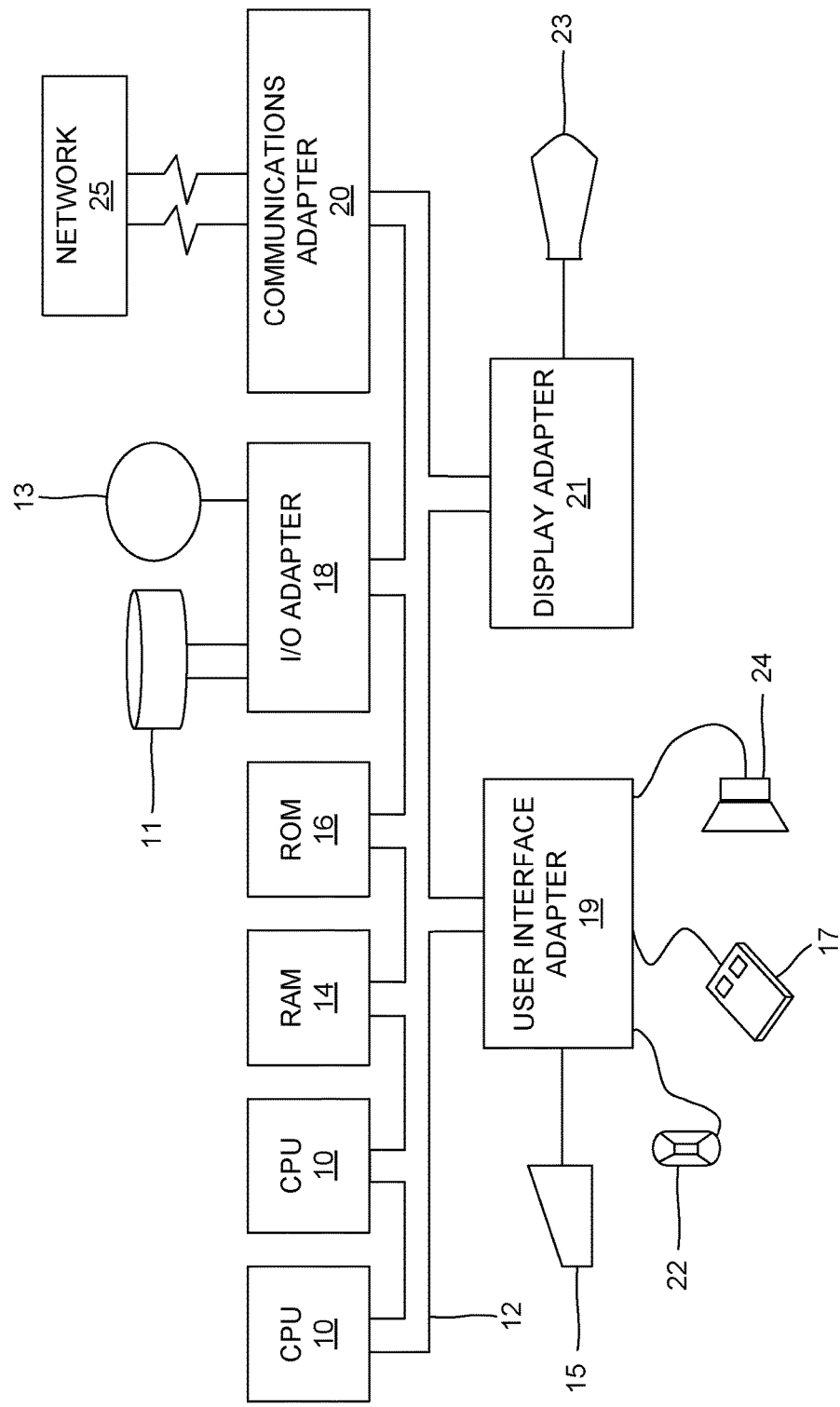
FIG. 12 illustrates a schematic diagram of a computer architecture used according to an embodiment herein.

A representative hardware environment for practicing the embodiments herein is depicted in FIG. 12. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The application provisioning system 106 is flexible to the network administrator in terms of defining custom templates with the form fields. The application provisioning system 106 captures specific user inputs required to change device configurations. The application provisioning system 106 is a vendor agnostic and is used to make extensible, customizable and support simple/standard/advanced provisioning templates. The application provisioning system 106 offers a shift from the existing method where the one or more users 102A-N are expected to have reasonable networking knowledge. The application provisioning system 106 acts as a self servicing portal for the one or more users 102A-N, who need not be a network professional.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An application provisioning system for requesting configuration updates for a plurality of application specific infrastructure components across data centers by generating an application provisioning request, said application provisioning system comprising:
a memory unit that stores a database and a set of modules; and
a processor configured to:
create an application provisioning template to receive one or more first inputs from a user for updating or creating configuration of an application specific infrastructure component, wherein said application provisioning template is created by
generating one or more customized form fields to receive said one or more first inputs associated with said application specific infrastructure component for updating or creating configuration of said application specific infrastructure component, wherein said application specific infrastructure component comprises at least one of a firewall device, an application delivery controller (ADC) device, a certificate or a domain name system (DNS);
automatically generating and executing a first script to fetch a first information associated with said application specific infrastructure component based on said one or more first inputs, wherein said first information comprises at least one of a data center of said application specific infrastructure component or a device type of said application specific infrastructure component; and
automatically generating and executing a second script to associate said fetched first information associated with said application specific infrastructure component with said corresponding one or more form fields in said application provisioning template;
automatically generate said application provisioning request for updating or creating configuration of said application specific infrastructure component based on said one or more first inputs and said first information associated with said application specific infrastructure component when said user submits said application provisioning template;
automatically generate and execute a third script for generating and implementing a work order for said application provisioning request, wherein said generation of said work order comprises
automatically compiling a logic to generate appropriate configuration commands using at least one of command line interface (CLI), or Application Program Interface (API) calls based on said one or more first inputs; and
automatically implementing said work order for updating or creating said
configuration of said application specific infrastructure component, wherein said implementation of said work order comprises automatic modification or updation or creation of said configuration of said application specific infrastructure component based on said application provisioning request raised in said work order and said appropriate configurations commands, wherein said processor is configured
provide a plurality of work orders spawned for said application provisioning request;
review said configurations of said application specific infrastructure component;
modify said configurations of said application specific infrastructure component;
submit said work order for approval;
implement said work order;
search a work order from said plurality of work orders using a plurality of keywords;
clone a work order to obtain a cloned work order when said work order that is implemented is rejected; and
modify or update said cloned work order and submit said updated cloned work order for approval.

2. The application provisioning system of claim 1, wherein said plurality of application specific infrastructure component comprises at least one of (i) a infrastructure component of an ADC device, (ii) a rule/policy of a firewall device, (iii) a certificate, (iv) a domain name system (DNS) record, and (v) a device that supports at least one of (a) said application program interface (API), and (b) said command line interface (CLI) mode of configuration.

3. The application provisioning system of claim 1, wherein said processor is configured to
provide a plurality of application provisioning templates that are stored in said database;
provide a plurality of application provisioning requests that are stored in said database; and
modify said plurality of application provisioning templates.

4. The application provisioning system of claim 3, wherein said processor is configured to
search at least one of said application provisioning request from said plurality of application provisioning requests based on a second input received from said user;
sort said plurality of application provisioning request based on column headers; and
(a) check updates for said plurality of application provisioning requests, and (b) check changes in status of said plurality of application provisioning requests.

5. The application provisioning system of claim 3, wherein said processor is configured to provide (a) details of activities performed on at least one of said application provisioning request, and (b) said plurality of work orders under said application provisioning request.

6. The application provisioning system of claim 3, wherein said processor is configured to search at least one of said application provisioning template from said plurality of application provisioning templates based on a third input received from said user.

7. The application provisioning system of claim 1, wherein said processor is configured to create a plurality of application provisioning requests in a single work order using said application provisioning template.

8. A computer implemented method for requesting configuration updates for plurality of application specific infrastructure components across data centers using an application provisioning system, said method comprising:
creating an application provisioning template to receive one or more first inputs from a user for updating or creating configuration of an application specific infrastructure component by:
generating one or more customized form fields to receive said one or more first inputs associated with said application specific infrastructure component for updating or creating configuration of said application specific infrastructure component, wherein said application specific infrastructure component comprises at least one of a firewall device, an application delivery controller (ADC) device, a certificate or a domain name system (DNS);

automatically generating and executing a first script to fetch a first information associated with said application specific infrastructure component based on said one or more first inputs, wherein said first information comprises at least one of a data center of said application specific infrastructure component or a device type of said application specific infrastructure component, and automatically generating and executing a second script to associate said fetched first information associated with said application specific infrastructure component with said corresponding one or more form fields in said application provisioning template;

automatically generating an application provisioning request for updating or creating configuration of said application specific infrastructure component based on said one or more first inputs and said first information associated with said application specific infrastructure component when said user submits said application provisioning template;

automatically generating and executing a third script for generating and implementing a work order for said application provisioning request, wherein said generation of said work order comprises automatically compiling a logic to generate appropriate configuration commands using at least one of command line interface (CLI), or Application Program Interface (API) calls based on said one or more first inputs;

automatically implementing said work order for updating or creating said configuration of said application specific infrastructure component, wherein said implementation of said work order comprises automatic modification or updation or creation of said configuration of said application specific infrastructure component based on said application provisioning request raised in said work order-and said appropriate configurations commands;

providing a plurality of work orders spawned for said application provisioning request;

reviewing said configurations of said application specific infrastructure component;

modifying said configurations of said application specific infrastructure component;

submitting said work order for approval;

implementing said work order;

searching a work order from said plurality of work orders using a plurality of keywords;

cloning a work order to obtain a cloned work order when said work order that is implemented is rejected; and modifying or updating said cloned work order and submitting said updated cloned work order for approval.

9. The computer implemented method of claim 8, wherein said method further comprises:

providing one or more application provisioning templates that are stored in a database;

providing one or more application provisioning requests that are stored in said database; and providing one or more work orders spawned for said application provisioning request.

10. The computer implemented method of claim 9, wherein said method further comprises:

modifying at least one application provisioning template selected from said one or more application provisioning templates.

11. A non-transitory program storage device readable by computer, and comprising a program of instructions executable by said computer to perform a method requesting configuration updates for plurality of application specific infrastructure component across data centers using an application provisioning system, said method comprising:

creating an application provisioning template to receive one or more first inputs from a user for updating or creating configuration of an application specific infrastructure component, wherein said application provisioning template is created by, generating one or more customized form fields to receive said one or more first inputs associated with said application specific infrastructure component for updating or creating configuration of said application specific infrastructure component, wherein said application specific infrastructure component comprises at least one of a firewall device, an application delivery controller (ADC) device, a certificate or a domain name system (DNS);

automatically generating and executing a first script to fetch a first information associated with said application specific infrastructure component based on said one or more first inputs, wherein said first information comprises at least one of a data center of said application specific infrastructure component or a device type of said application specific infrastructure component, and automatically generating and executing a second script to associate said fetched first information associated with said application specific infrastructure component with said corresponding one or more form fields in said application provisioning template;

automatically generating an application provisioning request for updating or creating configuration of said application specific infrastructure component based on said one or more first inputs and said first information associated with said application specific infrastructure component when said user submits said application provisioning template;

automatically generating and executing a third script for generating and implementing a work order for said application provisioning request, wherein said generation of said work order comprises automatically compiling a logic to generate appropriate configuration commands using at least one of command line interface (CLI), or Application Program Interface (API) calls based on said one or more first inputs;

automatically implementing said work order for updating or creating said configuration of said application specific infrastructure components, wherein said implementation of said work order comprises automatic modification or updation or creation of said configuration of said application specific infrastructure component based on said application provisioning request raised in said work order and said appropriate configurations commands:

providing a plurality of work orders spawned for said application provisioning request;

reviewing said configurations of said application specific infrastructure component;

modifying said configurations of said application specific infrastructure component;
submitting said work order for approval;
implementing said work order;
searching a work order from said plurality of work orders using a plurality of keywords;
cloning a work order to obtain a cloned work order when said work order that is implemented is rejected; and
modifying or updating said cloned work order and submitting said updated cloned work order for approval.

12. The non-transitory program storage device of claim 11, wherein said method further comprises:
providing one or more application provisioning templates that are stored in a database;
providing one or more application provisioning requests that are stored in said database; and
providing one or more work orders spawned for said application provisioning request.

13. The non-transitory program storage device of claim 12, wherein said method further comprises:
modifying at least one application provisioning template selected from said one or more application provisioning templates.

* * * * *